United States Patent
Youn et al.

(10) Patent No.: US 12,047,896 B2
(45) Date of Patent: Jul. 23, 2024

(54) CALLER INFORMATION VERIFICATION BASED ON PLURALITY OF SIMs

(71) Applicant: LG ELECTRONICS INC., Seoul (KR)

(72) Inventors: Myungjune Youn, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 347 days.

(21) Appl. No.: 17/632,208

(22) PCT Filed: Aug. 4, 2020

(86) PCT No.: PCT/KR2020/010265
§ 371 (c)(1),
(2) Date: Feb. 1, 2022

(87) PCT Pub. No.: WO2021/025428
PCT Pub. Date: Feb. 11, 2021

(65) Prior Publication Data
US 2022/0286993 A1    Sep. 8, 2022

(30) Foreign Application Priority Data

Aug. 7, 2019 (KR) .................. 10-2019-0096235

(51) Int. Cl.
*H04W 68/00* (2009.01)
*H04W 4/16* (2009.01)
(Continued)

(52) U.S. Cl.
CPC .......... *H04W 60/005* (2013.01); *H04W 4/16* (2013.01); *H04W 68/00* (2013.01); *H04W 80/10* (2013.01); *H04W 88/06* (2013.01)

(58) Field of Classification Search
CPC ..... H04W 60/005; H04W 60/00; H04W 4/16; H04W 68/00; H04W 80/10; H04W 88/06
See application file for complete search history.

(56) References Cited

U.S. PATENT DOCUMENTS 11,889,465 B2 * 1/2024 Ryu ................. H04W 76/20
2017/0303259 A1 10/2017 Lee et al.
(Continued)

FOREIGN PATENT DOCUMENTS

| KR | 20180120609 | 11/2018 |
|---|---|---|
| KR | 20190008381 | 1/2019 |
| WO | 2018008983 | 1/2018 |

OTHER PUBLICATIONS

PCT International Application No. PCT/KR2020/010265, International Search Report dated Nov. 11, 2020, 5 pages.
(Continued)

*Primary Examiner* — Khawar Iqbal
(74) *Attorney, Agent, or Firm* — LEE, HONG, DEGERMAN, KANG & WAIMEY

(57) ABSTRACT

One disclosure of the present specification provides a method by which an AMF node of a first network performs communication on the basis of a plurality of SIMs. The method comprises the steps of: receiving a registration request message from a terminal through a base station of the first network; receiving, from an SMF node of the first network, a first message including information requesting the activation of a PDU session of the terminal; receiving a second message that includes caller's ID information related to downlink data; and transmitting, to the terminal, a paging message or a non-access stratum (NAS) notification message including the caller's ID information through the base station of the first network.

14 Claims, 29 Drawing Sheets

(51) Int. Cl.
　　　*H04W 60/00*　　(2009.01)
　　　*H04W 80/10*　　(2009.01)
　　　*H04W 88/06*　　(2009.01)

(56) References Cited

U.S. PATENT DOCUMENTS

| | | | |
|---|---|---|---|
| 2019/0159015 A1 | 5/2019 | Qiao et al. | |
| 2021/0022111 A1* | 1/2021 | Kumar | H04W 52/0216 |
| 2022/0014889 A1* | 1/2022 | Ravichandran | H04W 8/183 |
| 2022/0104001 A1* | 3/2022 | Ou | H04W 8/08 |
| 2022/0124594 A1* | 4/2022 | Wang | H04W 60/04 |
| 2022/0225448 A1* | 7/2022 | Li | H04W 60/04 |
| 2022/0240213 A1* | 7/2022 | Ly | H04W 60/04 |
| 2022/0264522 A1* | 8/2022 | Brusilovsky | H04W 48/18 |
| 2022/0286993 A1* | 9/2022 | Youn | H04W 68/005 |
| 2022/0312538 A1* | 9/2022 | Zhang | H04W 8/183 |
| 2022/0369280 A1* | 11/2022 | Ryu | H04W 68/02 |
| 2023/0189208 A1* | 6/2023 | Kim | H04W 60/00 370/329 |
| 2024/0030995 A1* | 1/2024 | Zhang | H04L 5/0053 |

OTHER PUBLICATIONS

3rd Generation Partnership Project (3GPP), "Technical Specification Group Services and System Aspects; Study on Support for Multi-USIM Devices (Release 17)," 3GPP TR 22.834 V17.0.0, Jun. 2019, 17 pages.

\* cited by examiner

CALLER INFORMATION VERIFICATION BASED ON PLURALITY OF SIMs

CROSS-REFERENCE TO RELATED APPLICATIONS

This application is the National Stage filing under 35 U.S.C. 371 of International Application No. PCT/KR2020/010265, filed on Aug. 4, 2020, which claims the benefit of earlier filing date and right of priority to Korean Application No. 10-2019-0096235, filed on Aug. 7, 2019, the contents of which are all incorporated by reference herein in their entirety.

TECHNICAL FIELD

The present specification generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

In a 3rd Generation Partnership Project (3GPP) system such as a 4G network and a 5G network, there are terminals supporting a plurality of Subscriber Identity Modules (SIMs). For example, in a situation in which the terminal includes two SIMs (eg, a first SIM associated with PLMN 1 and a second SIM associated with PLMN 2), the terminal may register with PLMN 1 and PLMN 2 based on the respective SIMs.

In this case, the terminal needs to monitor both paging of PLMN 1 and PLMN 2 in the idle state, but if the paging occasion of PLMN 1 and the paging occasion of PLMN 2 overlap (overlapping), there is a problem that the terminal monitors only one PLMN at a time. In addition, there is a problem that while the terminal is provided with the service from the PLMN 1, the terminal cannot perform monitoring for the PLMN 2.

In a situation in which the terminal is receiving service from PLMN 1, MT service for the terminal may occur in PLMN 2. In this case, even if the terminal succeeds in monitoring the PLMN 2, conventionally, the terminal can only recognize the fact that the MT service has occurred in the PLMN 2. That is, there is a problem that the terminal does not know information2 (eg, a caller's phone number, an SMS origination phone number, etc.) about the MT service generated in PLMN, and the terminal only recognizes the fact that the service has occurred in PLMN 2. For this reason, the terminal could not provide information about the service generated in PLMN 2 to the user. There is a problem in that the terminal and/or the user must determine whether to receive the service from the PLMN 2 without specifically knowing information about the service generated from the PLMN 2.

Therefore, it is necessary to discuss a method for efficiently performing communication between a terminal supporting a plurality of SIMs and a network.

SUMMARY

Accordingly, a disclosure of the present specification has been made in an effort to solve the aforementioned problem.

In order to solve the above problems, one disclosure of the present specification provides a method for an AMF node of a first network to perform communication based on a plurality of SIMs. The method may include: receiving a registration request message from a terminal through a base station of a first network; receiving a first message including information for activating the PDU Session of the terminal from the SMF node of the first network; Receiving a second message including ID information of a caller related to downlink data; and transmitting a paging message or a Non Access Stratum (NAS) notification message including the caller's ID information to the terminal through the base station of the first network.

In order to solve the above problems, one disclosure of the present specification provides a method for a terminal to perform communication based on a plurality of SIMs. The method may include: transmitting a registration request message including information related to a plurality of SIMs to an AMF node of a first network through a base station of a first network; transmitting a SIP registration message including information related to the plurality of SIMs to a P-CSCF node of the first network through a base station of the first network; and while the terminal performs communication in the second network, a paging message or a Non Access Stratum (NAS) notification message including ID information of the caller and information related to the service type of the terminal through the base station of the first network It may include receiving from the AMF node of the first network.

In order to solve the above-described problem, one disclosure of the present specification may provide a network node of a first network that performs communication based on a plurality of SIMs. The network node includes at least one processor; and at least one memory to store instructions and operably electrically connectable to the at least one processor. The operation performed based on the execution of the command by the at least one processor may include: receiving a registration request message from a terminal through a base station of a first network; receiving a first message including information requesting activation of the PDU Session of the terminal from the SMF node of the first network; receiving a second message including ID information of a caller related to downlink data; and transmitting a paging message or a Non Access Stratum (NAS) notification message including the caller's ID information to the terminal through the base station of the first network.

In order to solve the above problems, one disclosure of the present specification may provide a wireless communication device that performs communication based on a plurality of SIMs. The wireless communication device includes at least one processor; and at least one memory to store instructions and operably electrically connectable to the at least one processor. The operation performed based on the instruction being executed by the at least one processor may include: transmitting a registration request message including information related to a plurality of SIMs to the AMF node of the first network through the base station of the first network step; transmitting a SIP registration message including information related to the plurality of SIMs to a UPF node of the first network through a base station of the first network; and while the terminal performs communication in the second network, a paging message or a Non Access Stratum (NAS) notification message including information related to the service type of the downlink data for the terminal and ID information of the caller is transmitted to the first and receiving from the AMF node of the first network through a base station of the network.

In order to solve the above problems, one disclosure of the present specification may provide an apparatus in mobile communication. The wireless communication device includes at least one processor; and at least one memory to store instructions and operably electrically connectable to the at least one processor. The operations performed based on the execution of the instructions by the at least one processor may include: generating a registration request message including information related to a plurality of SIMs; generating a SIP registration message including information related to the plurality of SIMs; and while the device performs communication in the second network, identifying a paging message or a NAS notification message including information related to the caller's ID information and the service type of downlink data for the terminal.

In order to solve the above problems, one disclosure of the present specification may include a non-volatile computer-readable storage medium in which instructions are recorded. The instructions, when executed by one or more processors, cause the one or more processors to: generate a registration request message comprising information related to a plurality of SIMs; generating a SIP registration message including information related to the plurality of SIMs; and while the device performs communication in the second network, identifying a paging message or NAS notification message including information related to the caller's ID information and the service type of downlink data for the terminal have.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

DESCRIPTION OF EXEMPLARY EMBODIMENTS

Figure 1:
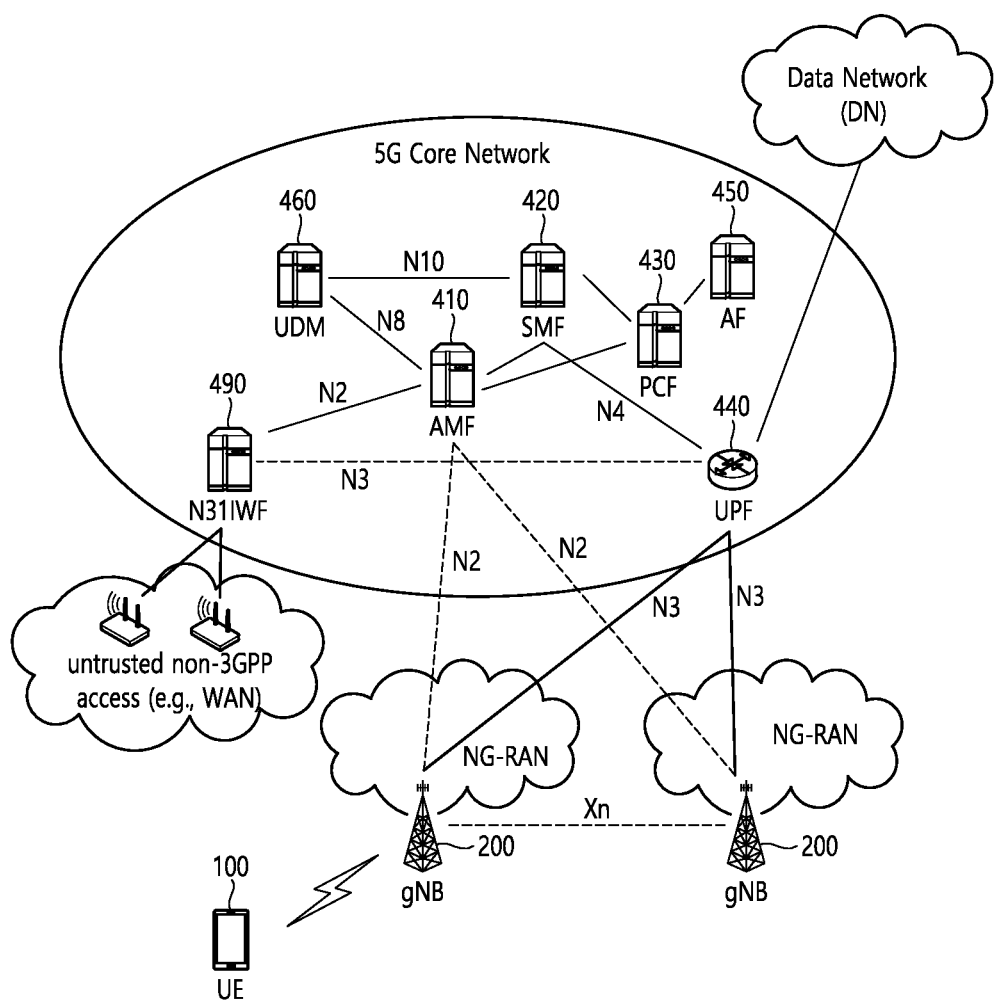
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP interworking function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The 5$^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
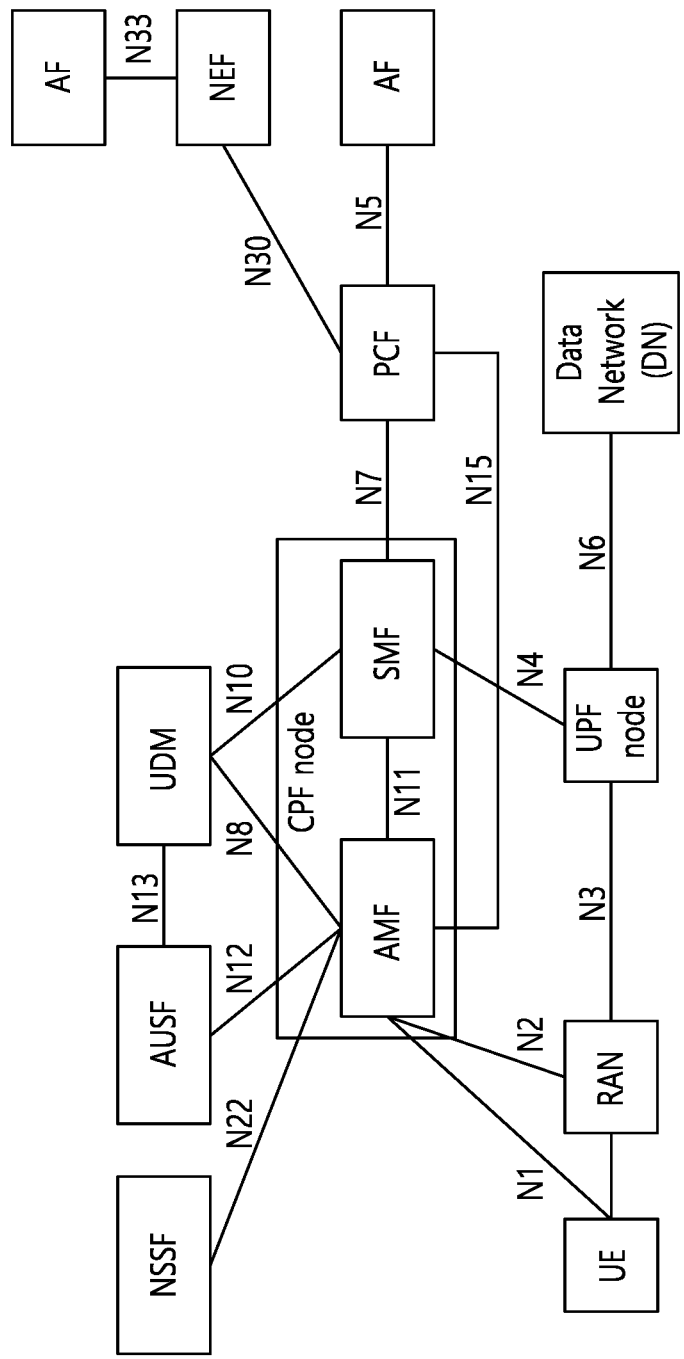
FIG. 2 is an exemplary diagram illustrating a predicted structure of a next generation mobile communication in terms of a node.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
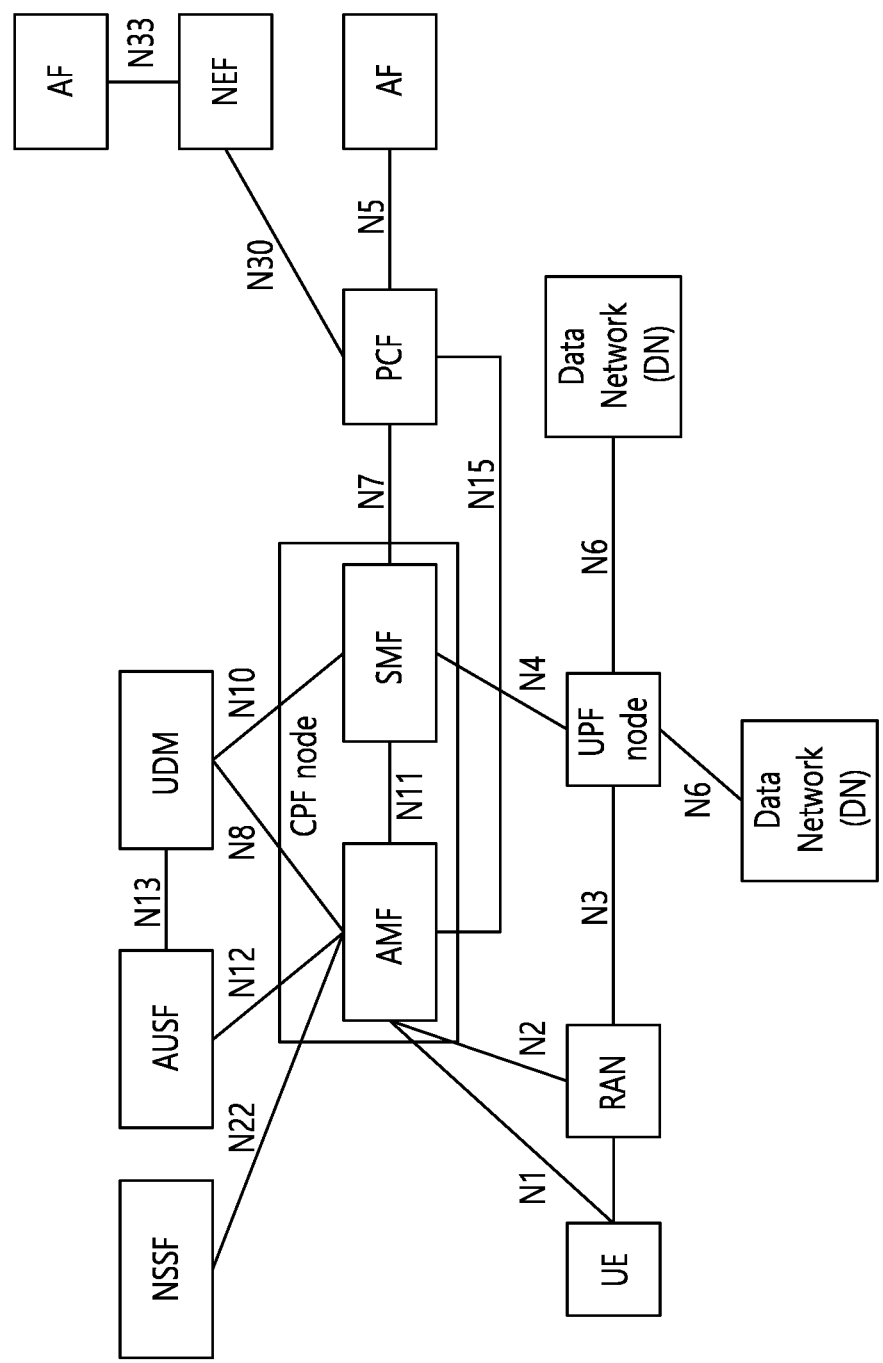
FIG. 3 illustrates an architecture that allows the UE to simultaneously access two data networks using one PDU session.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.

N13 represents Reference point between UDM and AUSF.

N14 represents Reference point between AMFs.

N15 represents Reference point between PCF and AMF in a non-roaming scenario and reference point between AMF and PCF of visited network in roaming scenario.

N16 represents Reference point between SMFs.

N22 represents Reference point between AMF and NSSF.

N30 represents Reference point between PCF and NEF.

N33 represents Reference point between AF and NEF.

In FIGS. 2 and 3, AF by a third party other than an operator may be connected to 5GC through a network exposure function (NEF).

Figure 4:
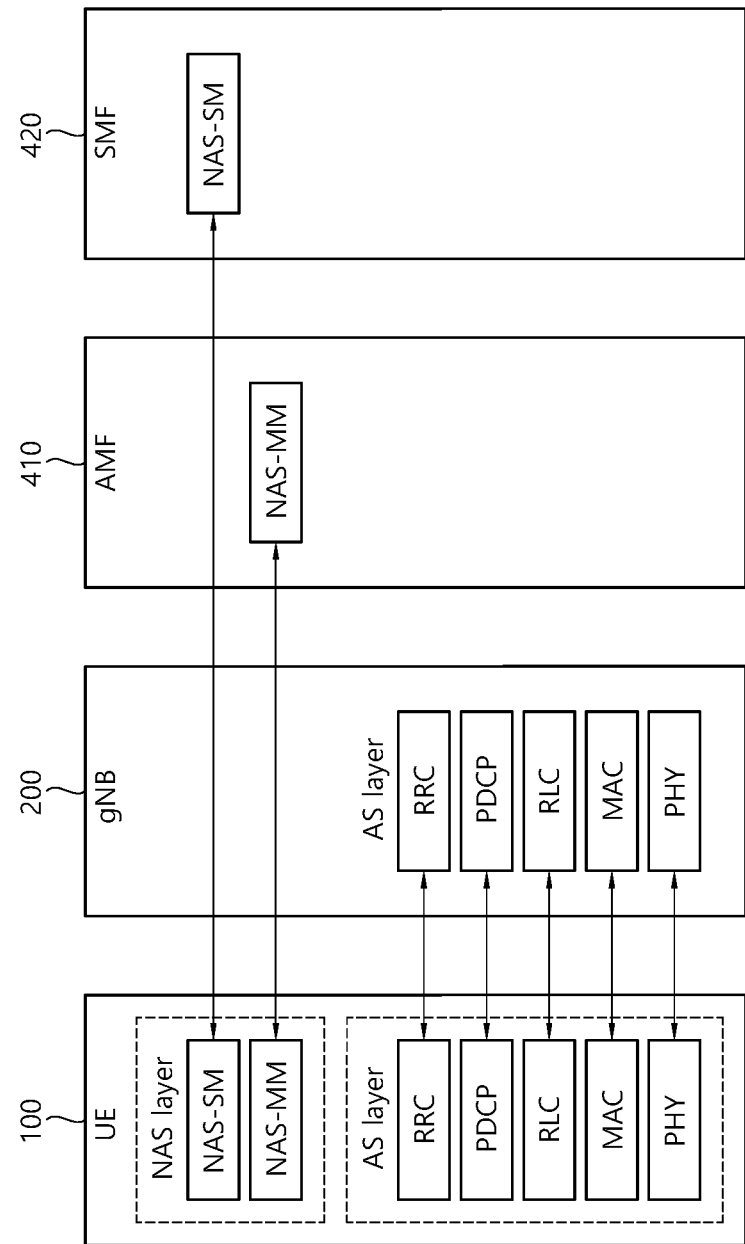
FIG. 4 is another exemplary diagram showing a structure of a radio interface protocol between a UE and a gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

Figure 5A:
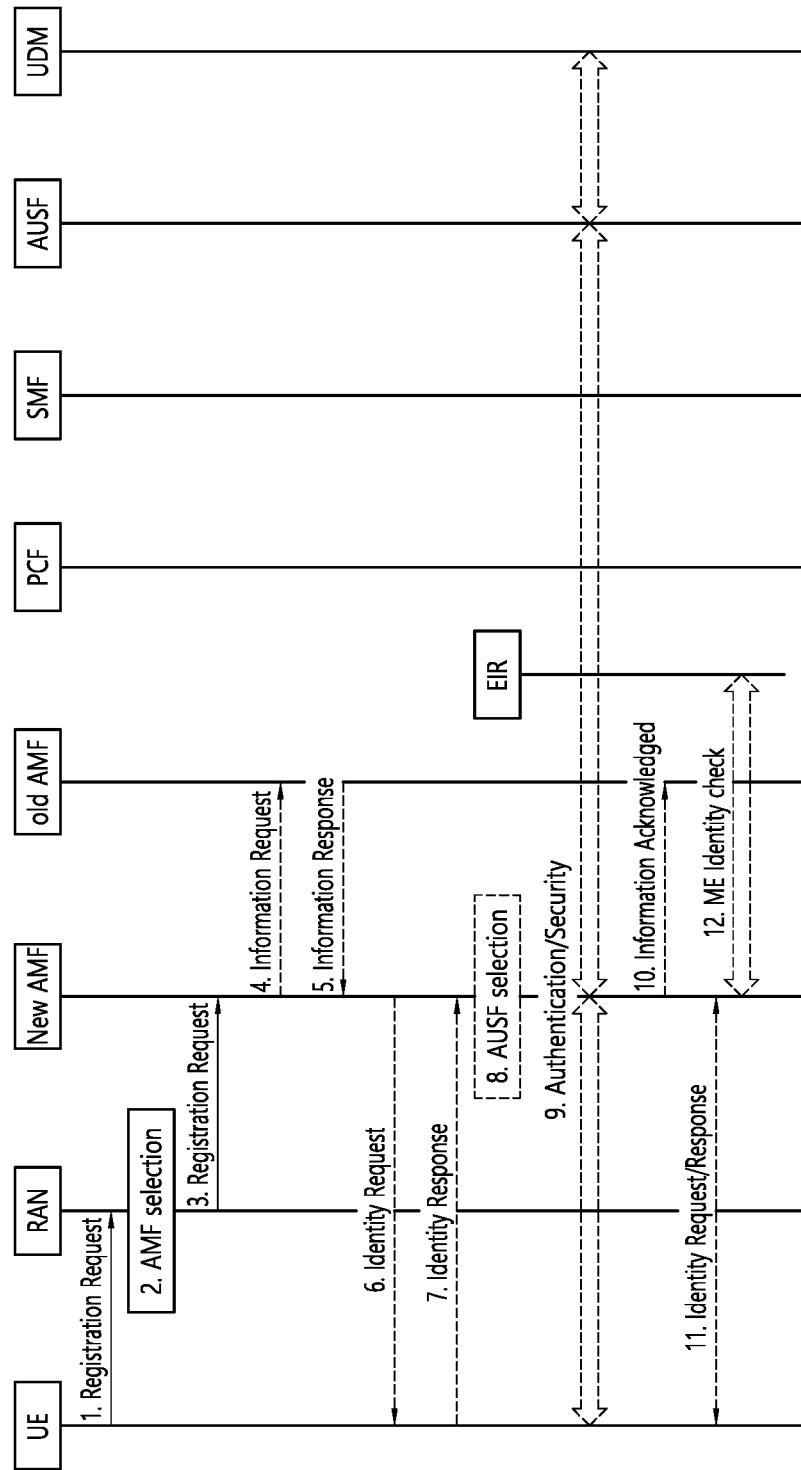
FIGS. 5a and 5b are signal flow charts showing an exemplary registration procedure.
Figure 5B:
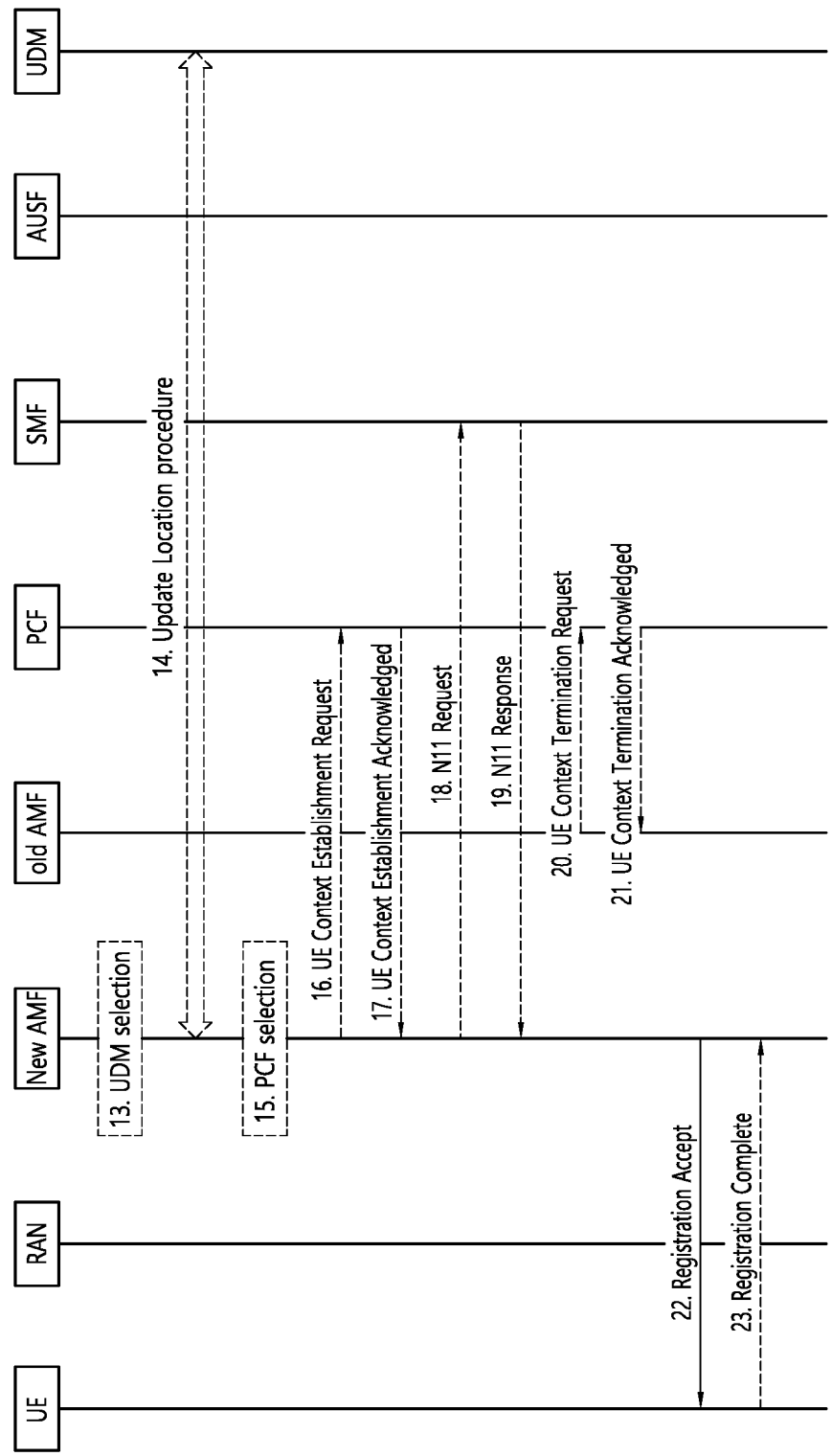

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<Service Request Procedures>

The service request procedure is used to request establishment of a secure connection to AMF by a UE or a 5G core network (5GC). The service request procedure is used to activate the user plane connection of the established PDU session even when the UE is in a CM-IDLE state and a CM-CONNECTED state. For reference, in order to reflect NAS signaling connection between the AMF and the UE, two CM states of the CM-IDLE state and the CM-CONNECTED state are used.

The UE does not initiate a service request procedure if there is an ongoing service request procedure.

The service request procedure includes a service request procedure initiated by the UE (i.e., a UE triggered service request) and a service request procedure initiated by the network (i.e., a network triggered service request).

Hereinafter, an example of the UE triggered service request procedure will be described with reference to FIGS. 6a to 6c, and an example of the network triggered service request procedure will be described with reference to FIG. 7. The service request procedure described in FIGS. 6a to 6c and 9 is only an example, and the service request procedure in the present disclosure includes all the service request procedures triggered by the UE and all the service request procedures triggered by the network.

Figure 6A:
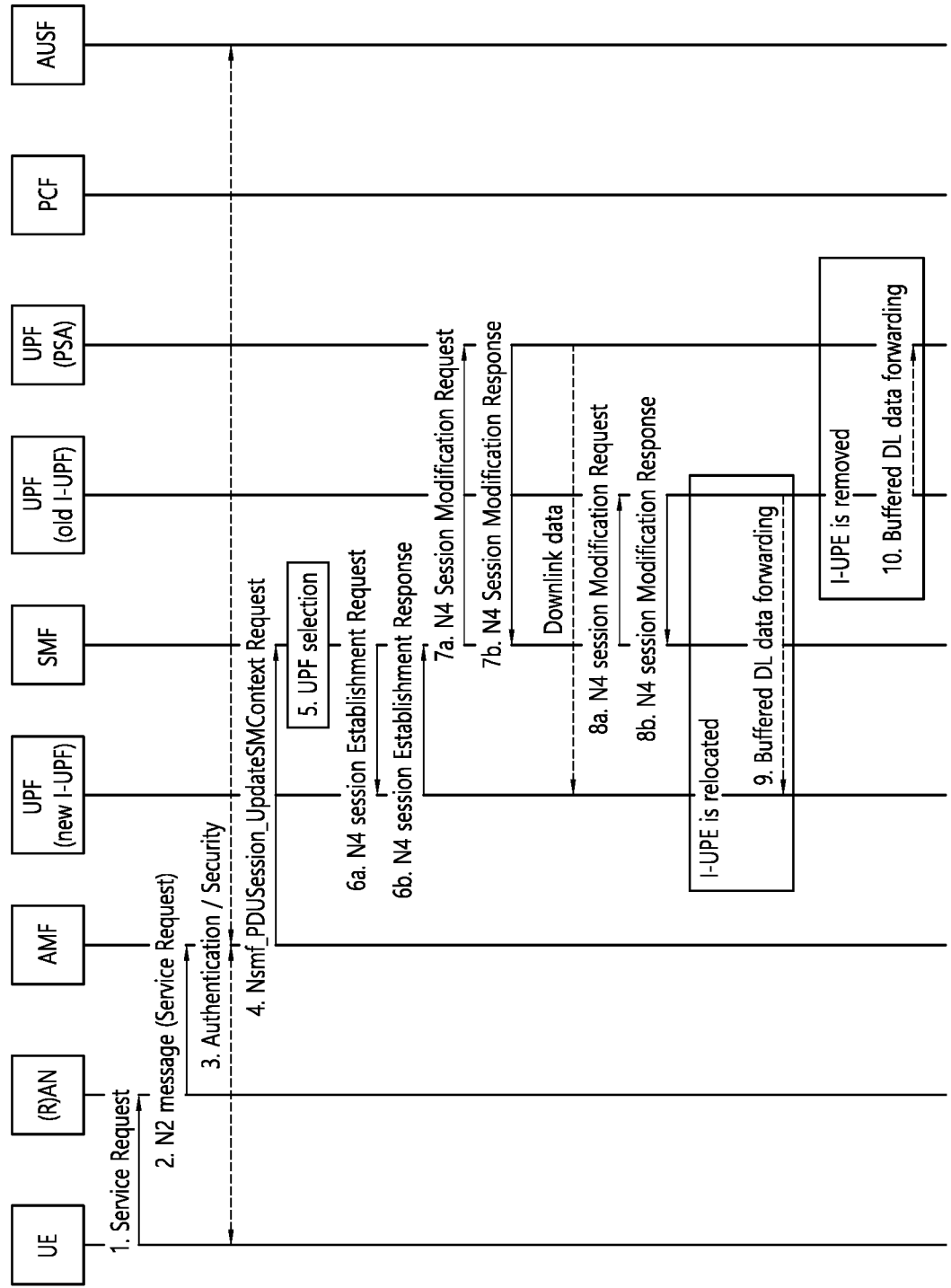
FIGS. 6a to 6c are signal flowcharts illustrating an exemplary UE triggered service request procedure.
Figure 6B:
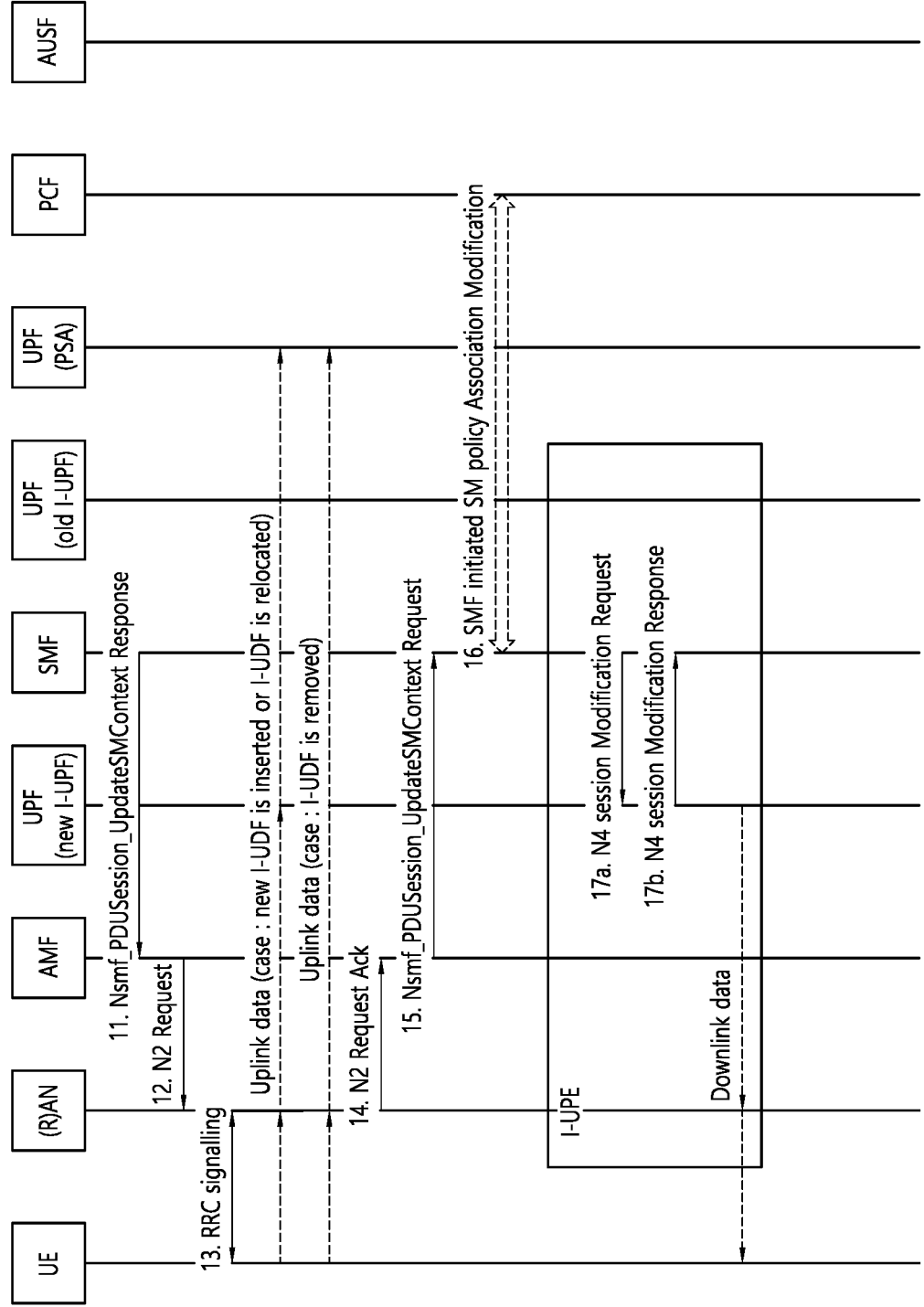
Figure 6C:
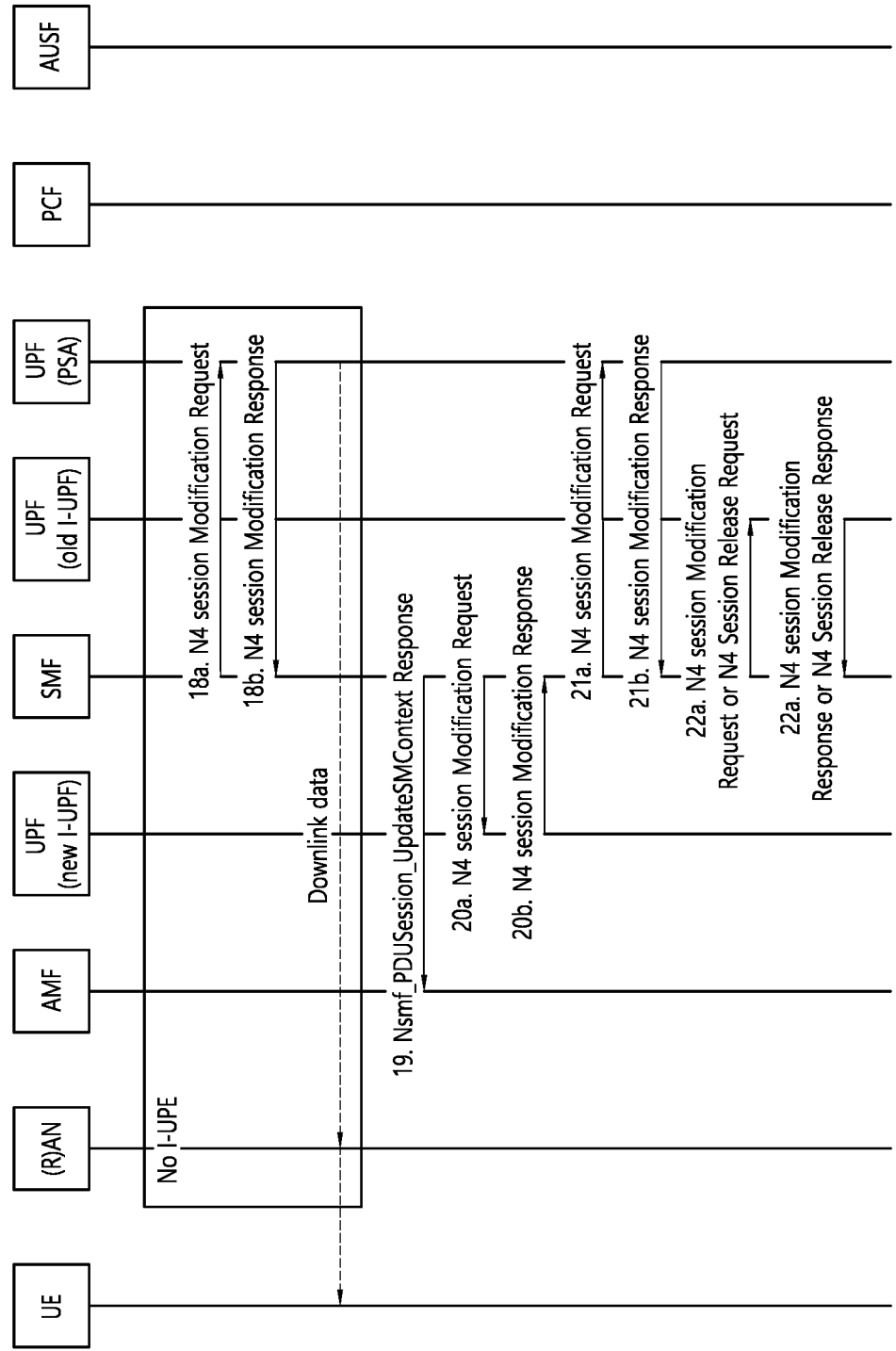

FIGS. 6a to 6c are signal flowcharts illustrating an exemplary UE triggered service request procedure.

The UE in the CM-ILDE state initiates a service request procedure to transmit a response on an uplink signaling message, user data, or network paging request. After receiving the service request message, the AMF may perform authentication. After establishing a signaling connection for AMF, the UE or the network may transmit a signaling message (e.g., establishment of a PDU session from the UE to the SMF through the AMF).

The service request procedure may be used by a UE in CM-CONNECTED state to request activation of a user plane connection for a PDU session and to respond to a NAS notification message received from the AMF.

For any service request procedure, if necessary, the AMF may include state information of the PDU session in a service accept message to synchronize a PDU session state between the UE and the network.

If the service request is not accepted by the network, the AMF responds to the UE with a service reject message. The service rejection message may include an indication or a cause code for requesting that the UE perform a registration update procedure.

In the UE triggered service request procedure, both SMF and UPF belong to a PLMN that serves the UE. For example, in a home routed roaming case, the SMF and UPF of the HPLMN are not affected by the service request procedure (that is, the SMF and UPF of the HPLMN are not involved in the service request procedure).

In response to a service request according to user data, the network may take additional action if the user plane connection activation is not successful.

The UE triggered service request procedure may be applied to a scenario with or without an intermediate UPF and a scenario with or without an intermediate UPF reselection.

1) Signaling from UE to (R)AN: the UE may transmit an access network (AN) message (including AN parameters, service request (list of PDU sessions to be activated, list of allowed PDU sessions), security parameters and PDU session status (status)) to the (R)AN.

The list of PDU sessions to be activated is provided by the UE when the UE attempts to re-activate the PDU session. The list of allowed PDU sessions is provided by the UE when the service request is a response to a NAS notification or paging of a PDU session related to non-3GPP access. And, the list of allowed PDU sessions identifies PDU sessions that may be moved to 3GPP access.

In case of NG-RAN:
AN parameters include the selected PLMN ID and establishment cause. The establishment cause provides a reason for requesting establishment of an RRC connection.

The UE transmits a service request message (message to AMF) encapsulated in an RRC message to the NG-RAN. The RRC message may be used to carry 5G system architecture evolution (SAE)-temporary mobile subscriber identity) (5G-S-TMSI).

When a service request is triggered for user data, the UE notifies a PDU session in which a user plane (UP) connection is to be activated in a service request message using a list of PDU sessions to be activated.

When the service request is triggered only for signaling, the UE does not include a list of PDU sessions to be activated.

When a service request procedure is triggered for a paging response and the UE has user data to be transmitted at the same time, the UE may inform about the PDU session with a UP connection to be activated in the service request message using the list of PDU sessions to be activated. Otherwise, the UE does not inform about any PDU session in the service request for paging response.

In a specific case, if there is no pending uplink data of PDU sessions, if a service request is triggered only for signaling, or if a service request is triggered for a paging response, the UE may include the PDU session to the list of PDU sessions to be activated.

When a service request through 3GPP access is triggered in response to a NAS notification indicating paging or non-3GPP access, the UE includes the non-3GPP PDU session that may be reactivated through 3GPp in the allowed PDU session list.

The PDU session state indicates a PDU session available in the UE.

When the UE is located outside an available area of the LADN, the UE does not trigger a service request procedure for a PDU session corresponding to the LADN. Also, when the service request is triggered for other reasons, the UE does not include the PDU session in the list of PDU sessions to be activated.

When the UE is in the CM-CONNECTED state, only a list of PDU sessions to be activated and a list of allowed PDU sessions may be included in the service request.

2) (R)AN to AMF signaling: (R)AN may transmit an N2 message to AMF. The N2 message may include N2 parameters, a service request, and a UE context request.

If the AMF cannot handle the service request, the AMF will reject the service request.

When NG-RAN is used, N2 parameter may include 5G-S-TMSI, the selected PLMN ID, location information, and establishment cause.

When the UE is in the CM-IDLE state, the NG-RAN may acquire 5G-S-TMSI in the RRC procedure. The NG-RAN may select AMF based on 5G-S-TMSI. The location information is related to a cell on which the UE camps.

Based on the PDU session state, the AMF may perform a PDU session release procedure for PDU sessions indicated by the UE that the PDU session ID is not available in the network.

3a) Signaling from AMF to (R)AN: AMF may transmit an N2 request to (R)AN. Here, the N2 request may include a security context, a handover restriction list, and a list of recommended cells/TAs/NG-RAN node identifiers.

When the 5G-AN requests for the UE context or the AMF needs to provide the UE context (e.g., when the AMF needs to initiate a fallback procedure for an emergency service), the AMF may initiate an NG application protocol (NGAP) procedure. For a UE in a CM-IDLE state, the 5G-AN stores security context in the UE AN context. The handover restriction list is related to mobility restrictions.

The 5G-AN uses the security context to protect messages exchanged with the UE.

When the NG-RAN node provides a list of recommended cells/TAs/NG-RAN node identifiers during the AN release procedure, the AMF may include the list of recommended cells/TAs/NG-RAN node identifiers in the N2 request. When the RAN determines to enable the RRC inactive state for the UE, the RAN may use this information to allocate a RAN notification area.

3) If the service request is not transmitted as being integrity protected or integrity protection verification failed, the AMF may initiate a NAS authentication/security procedure.

When the UE in the CM-IDLE state initiates a service request only for signaling connection, the UE and the network may exchange NAS signaling after successful establishment of the signaling connection, and steps 4 to 11 and steps 15 to 22 of FIGS. 6a to 6c may be omitted.

4) [Conditional Operation] Signaling from AMF to SMF: The AMF may transmit an Nsmf_PDUSession_UpdateSM-ContextRequest to the SMF. Here, the Nsmf_PDUSession_UpdateSMContext Request may include a PDU session ID, operation type, UE location information, access type, RAT type, and UE presence in LADN service area.

Nsmf_PDUSession_UpdateSMContext Request is invoked in the following cases:
 When the UE includes a list of PDU sessions to be activated in the service request message;
 When this procedure is triggered by the SMF but a PDU session identified by the UE is correlated with a PDU session ID different from the PDU session ID that triggers this procedure;
 When this procedure is triggered by the SMF but a current UE location is outside the "area of validity for the N2 SM information" provided by the SMF. In this case, the AMF does not transmit the N2 information provided by the SMF. If the current UE location is outside the "available area of N2 SM information", steps 4 to 11 are omitted.

If the DNN corresponds to the LADN, "the presence of the UE in the LADN service area" indicates whether the UE is inside (IN) or outside (OUT) the LADN service area. If the AMF does not provide an indication of "the presence of a UE in the LADN service area" and the SMF determines that the DNN corresponds to the LADN, the SMF considers the UE to be outside the LADN service area.

The AMF determines whether the PDU session(s) will be activated. In addition, the AMF transmits the Nsmf_PDUSession_UpdateSMContext Request related to the PDU session to the SMF along with an operation type set to "UP active" to indicate establishment of the user plane resource for the PDU session. The AMF determines an access type and an RAT type based on a global RAN node ID related to an N2 interface.

If this procedure is triggered in response to a paging or NAS notification indicating non-3GPP access and the UE is not on the list (provided by the UE) of PDU sessions allowed in the paged or notified PDU session, the AMF may notify the SMF that the user plane for the PDU session cannot be reactivated. The service request procedure may be terminated without reactivation of the user plane for other PDU sessions in the list of allowed PDU sessions.

While the previous NAS signaling connection through the NG-RAN is maintained, the AMF may receive a service request through the NG-RAN to establish another NAS signaling connection. In this case, in order to release the previous NAS signaling connection, AMF may trigger an AN release procedure for the old NG-RAN according to the following logic:
 For the PDU session indicated in the "list of PDU sessions to be activated", the AMF may request the SMF to immediately activate the PDU session by performing this step 4.
 For a PDU session included in the "list of PDU session ID(s) with active N3 user plane" but not included in the "list of PDU sessions to be activated", the AMF may request the SMF to deactivate the PDU session.

5) If the PDU session ID corresponds to the LADN and the SMF determines that the UE is located outside the available area of the LADN based on the "UE presence in the LADN service area" provided by the AMF, the SMF may determine to perform the following actions (based on a local policy).
 SMF may maintain the PDU session. However, the SMF may reject the activation of the user plane connection of the PDU session and notify the AMF accordingly. When the service request procedure is triggered by the network initiated service request, the SMF may notify the UPF (UPF that has sent data notification) that the UPF should discard downlink data for the PDU session and/or should not provide an additional data notification message; or
 The SMF may release the PDU session: The SMF may release the PDU session and inform the AMF that the PDU session has been released.
 In the above two cases, the SMF responds to the AMF with an appropriate reject cause, and user plane activation of the PDU session may be stopped.

When the SMF determines that the UE is located in the LADN available area, the SMF may check a UPF selection criterion based on the location information received from the AMF and determine to perform one of the following operations:
 The SMF accepts the activation of the UP connection and may continue to use the current UPF;
 When the UE moves outside the service area of the UPF (the UPF previously connected to the AN), the SMF, while maintaining the UPF acting as a PDU session anchor, may accept activation of the UP connection and select a new intermediate UPF (or may add/remove intermediate UPFs (I-UPF)). The steps to perform the addition/change/removal of the I-UPF are described below through conditional steps.
 NOTE 1: When old and/or new I-UPF implements a UL uplink classifier (CL) or branching point (BP) function and a PDU session anchor for connectivity of local access to the data network, the signaling described in this figure is intended as signaling for adding, removing, or changing a PDU session anchor, and signaling for adding, releasing, or changing UL CL or BP, should be performed by a different procedure.
 The SMF may reject activation of the UP connection of the PDU session in session and service continuity (SSC) mode 2. In addition, after the service request procedure, the SMF may trigger re-establishment of a PDU session in order to perform allocation of a new UPF (UPF acting as a PDU session anchor). (This operation may be performed, for example, when the UE is moved outside the service area of the anchor UPF connected to the NG-RAN)

6a) [Conditional operation] Signaling from SMF to new UPF (or new I-UPF): The SMF may transmit an N4 session establishment request to the UPF.

When the SMF selects a new UPF acting as an I-UPF for a PDU session or when the SMF chooses to insert an I-UPF for a PDU session (which did not have an I-UPF), the SMF may transmit a N4 session establishment request to the UPF. Here, the N4 establishment request provides packet detection to be installed in the I-UPF, data forwarding, enforcement, and reporting rules. PDU session anchor addressing information for a PDU session (PDU session anchor addressing information at an N9 reference point (a reference point between two UPFs)) is also provided to the I-UPF.

When a service request is triggered by the network, and the SMF selects a new UPF to replace the existing UPF (or the existing I-UPF), the SMF may include a data forwarding indication in the N4 session establishment request. The data forwarding indication may indicate to the UPF that second tunnel endpoint needs to be reserved for DL data buffered after being provided from the previous I-UPF.

6b) Signaling from new UPF (or I-UPF) to the SMF: The new UPF (or I-UPF) may transmit an N2 session establishment response (N4 Session establishment response) to the SMF.

The new I-UPF may transmit an N4 session establishment response to the SMF. When the UPF allocates CN tunnel information, the new I-UPF may transmit DL core network (CN) tunnel information for the UPF acting as a PDU session anchor and UL tunnel information of the new I-UPF to the SMF. When a data transfer indication is received, a new UPF (or I-UPF) operating as an N3 terminating point may transmit DL tunnel information of the new I-UPF to the SMF for data transmission from the existing UPF (or I-UPF) to the SMF. If the previous I-UPF resource exists, the SMF may drive a timer to be used in step 22a to release the corresponding resource.

7a) [Conditional operation] Signaling from SMF to UPF (PSA: PDU session anchor) signaling: SMF may transmit an N4 session modification request to the UPF.

When the SMF selects a new UPF to operate as an I-UPF for a PDU session, the SMF may transmit an N4 session modification request message to the PDU session anchor UPF to provide DL tunnel information received from the new I-UPF. When a new I-UPF is added for a PDU session, the UPF (PSA) may provide DL data to the new I-UPF as indicated in the DL tunnel information.

If a service request is triggered by the network and the SMF removes the existing I-UPF and does not replace the existing I-UPF with a new I-UPF, the SMF may include the data forwarding indication in the N4 session modification request. The data forwarding indication may indicate to the UPF (PSA) that the second tunnel endpoint needs to be reserved for buffered DL data received from the existing I-UPF. In this case, the UPF (PSA) may start buffering DL data that may be simultaneously received from the N6 interface.

7b) The UPF (PSA) may transmit an N4 session modification response message to the SMF.

When the UPF (PSA) receives the data forwarding indication, the UPF (PSA) becomes an N3 endpoint and the UPF (PSA) may transmit CN DL tunnel information for the previous UPF (or I-UPF) to the SMF. The SMF may start a timer. If the previous I-UPF resource exists, the SMF may drive a timer to be used in step 22a in order to release the corresponding resource.

When the UPF connected to the RAN is a UPF(PSA) and the SMF receives Nsmf_PDUSession_UpdateSMContext Request (including operation type set to "UP activate" to indicate establishment of user plane resource for the PDU session), if the SMF finds that the PDU session is active, the SMF may initiate an N4 session modification procedure to remove the AN tunnel information and remove the AN tunnel information from the UPF.

8a) [Conditional operation] Signaling from SMF to existing UPF (or I-UPF): The SMF may transmit N4 session modification (including new UPF address, new UPF DL tunnel ID) to the existing UPF (or I-UPF).

When a service request is triggered by the network and the SMF removes the existing UPF (or I-UPF), the SMF may transmit an N4 session modification request message to the existing UPF (or I-UPF) to provide DL tunnel information for buffered DL data. When the SMF allocates a new I-UPF, the DL tunnel information is received from a new UPF (or I-UPF) operating as an N3 endpoint. If the SMF does not allocate a new I-UPF, the DL tunnel information is transmitted from the UPF (PSA) operating as an N3 endpoint. The SMF may drive a timer for monitoring a forwarding tunnel as in step 6b or 7b.

When the SMF receives the Nsmf_PDUSession_UpdateSMContext Request of step 4 (including an operation type set to "UP activate" to instruct establishment of user plane resources for the PDU session), if the SMF knows that the PDU session has been activated, the SMF may remove the AN tunnel information to remove tunnel information of the AN in the UPF and may initiate an N4 session modification procedure.

8b) Signaling from the existing UPF (or I-UPF) to the SMF: The existing UPF (or I-UPF) may transmit an N4 session modification response message to the SMF.

9) [Conditional operation] Signaling from an existing UPF (or I-UPF) to a new UPF (or I-UPF): The existing UPF (or I-UPF) may deliver downlink data buffered with a new UPF (or I-UPF).

When the I-UPF is changed and a forwarding tunnel is established for a new I-UPF, the existing UPF (or I-UPF) transfers the buffered data to the new UPF (or I-UPF) operating as an N3 endpoint.

10) [Conditional operation] Signaling from the existing UPF (or I-UPF) to the UPF (PSA): The existing UPF (or I-UPF) may transfer buffered downlink data to the UPF (PSA).

When the existing I-UPF is removed, the new I-UPF is not allocated t the PDU session, and a forwarding tunnel is established for the UPF (PSA), the existing UPF (or I-UPF) may transfer the data buffered to the existing UPF (or I-UPF) to a new UPF (PSA) acting as an N3 endpoint.

11) [Conditional Operation] Signaling from SMF to AMF: SMF may transmit Nsmf_PDUSession_UpdateSMContext Response to AMF. Nsmf_PDUSession_UpdateSMContext Response may include N2 SM information (PDU session ID, QFI(s) (QoS Flow ID), quality of service (QoS) profile, CN N3 tunnel information, S-NSSAI, user plane security enforcement, UE integrity protection maximum data rate, and a cause. When the UPF connected to the RAN is UPF (PSA), the CN N3 tunnel information is UL tunnel information of UPF (PSA). When the UPF connected to the RAN is a new I-UPF, the CN N3 tunnel information is UL tunnel information of the I-UPF.

For the PDU session in which the SMF determines to accept the activation of the UP connection in step 5, the SMF may generate only N2 SM information and transmit an Nsmf_PDUSession_UpdateSMContext Response to the AMF to establish a user plane. The N2 SM information may include information to be provided by AMF to the NG-RAN. When the SMF determines to change the PSA UPF for the SSC mode 3 PDU session, the SMF may trigger a change of the SSC mode 3 PDU session anchor as an independent procedure after accepting UP activation of the PDU session.

The SMF may reject the activation of the UP of the PDU session by including the cause in the Nsmf_PDUSession_UpdateSMContext Response. The SMF may reject activation of the UP of the PDU session in the following cases, for example:

When the PDU session corresponds to the LADN and the UE is located outside the available area of the LADN as in step 5;

When the AMF informs the SMF that the UE is reachable only for a regulatory prioritized service and the PDU session to be activated is not for the regulatory prioritized service; or When the SMF determines to change the PSA UPF for the requested PDU session as in step 5. In this case, after the SMF transmits the Nsmf_PDUSession_UpdateSMContext Response, the SMF may perform another procedure to instruct the UE to re-establish the PDU session for SSC mode 2.

If the SMF receives a negative response in step 6b due to UPF resource unavailability.

When an EPS bearer ID is assigned to a PDU session, the SMF maps the EPS bearer ID and QFI to N2 SM information and transmits the same to the NG-RAN.

User plane security enforcement information is determined by the SMF during a PDU session establishment procedure. When integrity protection indicates "preferred" or "required", the SMF may also include UE integrity protection maximum data rate in the user plane security enforcement information.

12) Signaling from AMF to (R)AN: The AMF may transmit an N2 request to (R)AN. N2 request may include N2 SM information received from the SMF, security context, handover restriction list, subscribed UE-aggregate maximum bit rate (AMBR), MM NAS service acceptance (a list of recommended cells/TAs/NG-RAN node identifiers, and UE radio capability. Allowed NSSAI for the access type of the UE may be included in the N2 message.

When the UE triggers a service request while in the CM-CONNECTED state, only N2 SM information received from the SMF and MM NAS service acceptance may be included in the N2 request.

While the UE is in the CM-CONNECTED state, when a service request procedure is triggered by the network, only N2 SM information received from the SMF may be included in the N2 request.

When the service request procedure is triggered, the NG-RAN may store the security context and the NAS signaling connection Id for the UE in the CM-IDLE state. When the service request is not triggered by the UE only for the signaling connection, the RAN may store QoS information for a QoS flow of the activated PDU session, an N3 tunnel ID of the UE RAN context, and a handover restriction list.

MM NAS service acceptance may include a PDU session state of the AMF. During the session request procedure, certain local PDU session release may be notified to the UE through the PDU session state. The service acceptance message includes a PDU session reactivation result. The PDU session reactivation result provides an activation result for the PDU session of the allowed PDU session list which has generated a PDU session in the list of allowed PDU sessions and paging or NAS notification. If the PDU session reactivation result of the PDU session is failure, a cause of the failure may also be provided.

When there are a plurality of PDU sessions related to a plurality of SMFs, the AMF does not need to wait for a response from all SMFs in step 11. However, the AMF must wait for all responses from the plurality of SMFs before transmitting an MM NAS service acceptance message to the UE.

When step 12 is triggered for PDU session user plane activation, the AMF may include at least one N2 SM information received from the SMF in the N2 request. When there is additional N2 SM information received from the SMF, the AMF may include the additional N2 SM information received from the SMF in a separate N2 message (e.g., N2 tunnel setup request) and transmit the same. Alternatively, when a plurality of SMFs are involved, after all Nsmf_PDUSession_UpdateSMContext response service operations related to the UE are received from the SMF, the AMF may transmit one N2 request message to the (R)AN.

When the NG-RAN node provides a list of recommended cells/TAs/NG-RAN node identifiers during the AN release procedure, the AMF may include a list of recommended cells/TAs/NG-RAN node identifiers in the N2 request. When the NG-RAN determines to enable the RRC inactive state for the UE, the NG-RAN may use this information to allocate the RAN notification area.

The AMF based on the network configuration may include "RRC inactive assistance information" of the UE in the N2 request.

If possible, the AMF may include UE radio capability information in the N2 request and transmit the same to the NG-RAN node.

13) Signaling from (R)AN to UE: The NG-RAN may perform RRC connection reconfiguration with the UE. Specifically, the NG-RAN may perform RRC connection reconfiguration with the UE according to QoS information on all QoS flows of a data radio bearer and a PDU session in which the UP connection is activated. For the UE that was in the CM-IDLE state, if the service request is not triggered by the UE only for a signaling connection, user plane security may be established in this step. For the UE in the CM-IDLE state, when a service request is triggered by the UE only for signaling connection, the AS security context may be established in this step.

When the N2 request includes a NAS message, the NG-RAN may deliver the NAS message to the UE. The UE deletes the context of the PDU session that is not available in 5GC locally.

NOTE 2: The reception of the service acceptance message may not mean that the user plane radio resource has been successfully activated.

After the user plane radio resource is set up, uplink data from the UE may now be delivered to the NG-RAN. The NG-RAN may transmit uplink data to the UPF address and tunnel ID provided in step 11.

14) [Conditional operation] Signaling from (R)AN to AMF: The (R)AN may transmit acknowledgement for N2 request to the AMF. For example, the (R)AN may transmit an N2 request Ack to the AMF. Here, the N2 request Ack may include N2 SM information (including AN tunnel information, list of accepted QoS flows for the PDU sessions whose UP connections are activated and a list of rejected QoS Flows for the PDU Sessions whose UP connections are activated) and a PDU session ID.

The message including the N2 request Ack may include N2 SM information (e.g., AN tunnel information). When the AMF transmits a separate N2 message in step 11, the NG-RAN may respond to N2 SM information with a separate N2 message.

When a plurality of N2 SM messages are included in the N2 request message of step 12, the N2 request Ack may include a plurality of N2 SM information and information enabling the AMF to associate a response with a related SMF.

15) [Conditional operation] Signaling from AMF to SMF: The AMF may transmit an Nsmf_PDUSession_UpdateSMContext request (including N2 SM information, RAT type, and access type) per PDU session to the SMF. The AMF may determine the access type and the RAT type based on the global RAN node ID associated with the N2 interface.

When the AMF receives the N2 SM information (one or more) in step 14, the AMF may deliver the N2 SM information to the related SMF per PDU session ID. When a UE time zone is changed compared to a previously reported UE time zone, the AMF may include UE time zone information element (IE) in the Nsmf_PDUSession_UpdateSMContext request.

16) [Optional action] Signaling from SMF to PCF: When dynamic PCC is distributed, SMF performs SMF initiated SM policy modification procedure to initiate notification of new location information to the PCF (if subscribed). The PCF may provide updated policies.

17a) [Conditional operation] Signaling from the SMF to new I-UPF: The SMF may transmit an N4 session modification request to a new I-UPF. The N4 session modification request may include AN tunnel information and a list of accepted QFIs.

When the SMF selects a new SMF to operate as an I-UPF for the PDU session in step 5, the SMF may initiate an N4 session modification procedure for the new I-UPF and provide AN tunnel information. Downlink data from the new I-UPF may be delivered to the NG-RAN and UE.

17b) [Conditional Operation] Signaling from UPF to SMF: The UPF may transmit an N4 session modification response to the SMF.

18a) [Conditional operation] Signaling from SMF to UPF (PSA): The SMF may transmit an N4 session modification request to UPF (PSA). The N4 session modification request may include AN tunnel information and a list of rejected QoS flows.

If the user plane is set up or modified and if there is no I-UPF after modification, the SMF may initiate the N4 session modification procedure for the UPF (PSA) and provide AN tunnel information. Downlink data from the UPF (PSA) may now be delivered to the NG-RAN and UE.

For QoS flows in the list of rejected QoS flows, the SMF may instruct the UPF to remove rules related to the corresponding QoS flow (e.g., packet detection rules, etc.).

18b) [Conditional operation] Signaling from UPF to SMF: The UPF may transmit an N4 session modification response to the SMF.

19) [Conditional operation] Signaling from SMF to AMF: The SMF may transmit an Nsmf_PDUSession_UpdateSMContext response to the AMF.

20a) [Conditional operation] Signaling from SMF to new UPF (or I-UPF): The SMF may transmit an N4 session modification request to a new UPF (or I-UPF).

When the forwarding tunnel is established for the new I-UPF and when the timer set by the SMF for the forwarding tunnel in step 8a expires, the SMF may transmit an N4 session modification request to the new UPF (or I-UPF) operating as an N3 endpoint to release the forwarding tunnel.

20b) [Conditional operation] Signaling from new UPF (or I-UPF) to SMF: The new UPF (or I-UPF) may transmit an N4 session modification response to the SMF.

The new UPF (or I-UPF) operating as the N3 endpoint may transmit an N4 session modification response to the SMF.

21a) [Conditional operation] Signaling from SMF to UPF (PSA): The SMF may transmit an N4 session modification request to the UPF (PSA).

When the forwarding tunnel is established for the UPF (PSA) and when the timer set by the SMF for the forwarding tunnel in step 7b expires, the SMF may transmit an N4 session modification request to the UPF (PSA) operating as the N3 endpoint to release the forwarding tunnel.

21b) [Conditional operation] Signaling from UPF (PSA) to SMF: UPF (PSA) may transmit an N4 session modification response to the SMF.

UPF (PSA) operating as an N3 endpoint may transmit an N4 session modification response to the SMF.

22a) [Conditional operation] Signaling from SMF to previous UPF: The SMF may transmit an N4 session modification request or an N4 session release request to the previous UPF.

When the SMF determines to continue to use the previous UPF in step 5, the SMF may transmit the N4 session modification request to the previous UPF and provide AN tunnel information.

When the SMF selects a new UPF operating as an I-UPF in step 5 and the previous UPF is not a PSA UPF, the SMF may initiate resource release by transmitting an N4 session release request (including release cause) to the previous I-UPF after the timer in step 6b or 7b expires.

22b) Signaling from previous I-UPF to the SMF: The previous I-UPF may transmit an N4 session modification response or an N4 session release response to the SMF.

The previous UPF checks the modification or release of resources through a N4 session modification response or a N4 session release response.

An example of the UE initiated service request procedure is the same as steps 1 to 22b described above.

For mobility-related events, the AMF may invoke an Namf_EventExposure_Notify service operation after step 4.

When Namf_EventExposure_Notify is received with an indication that the UE is reachable, if the SMF has pending DL data, the SMF may invoke the Namf_Communication_N1N2MessageTransfer service operation for the AMF to establish a user plane for the PDU session. In other cases, the SMF may resume transmitting the DL data notification to the AMF in the case of DL data.

<Multiple USIMs>

The 3GPP system may support a terminal (eg, ME) including a plurality of USIMs registered at the same time. For example, a plurality of Universal Subscriber Identity Modules (USIMs) may be included in the same Universal Integrated Circuit Card (UICC) or included in different UICCs.

An operation of a terminal related to simultaneous handling of a plurality of USIMs may vary according to the capability of the terminal. The function of the terminal may mean, for example, a terminal capable of single Rx (reception)/single Tx (transmission), a terminal capable of dual Rx/single Tx, and a terminal capable of dual Rx/dual Tx.

Hereinafter, a terminal using a plurality of USIMs may be referred to as a MUSIM UE. Dual Rx may enable Multiple USIM UE (MUSIM UE) to simultaneously receive traffic from two networks (eg, networks corresponding to each of two USIMs included in the MISIM UE). Dual Tx may enable the MUSIM UE to transmit traffic to both networks simultaneously. A single Rx may allow a MUSIM UE to receive traffic from one network at a time. A single Tx may allow a MUSIM UE to send traffic to one network at a time.

The MUSIM UE may allow the user to set the user's preference for the same service or different services based on multiple USIMs. Multiple USIMs may be provided by the same MNO or different MNOs.

Based on the service preference set by the user, a MUSIM UE actively engaged in communication related to one USIM may determine i) whether to monitor a paging channel related to another registered USIM or ii) whether to present a mobile terminated service to the user triggered a paging request related to another registered USIM.

When USIMs of different operators are provided by different MNOs, the 3GPP system shall not restrict the use of USIMs of other operators by one operator. For reference, the 3GPP system may refer to a communication system supporting communication technologies such as LTE and 5G.

The 3GPP system must be able to securely support a MUSIM UE having a plurality of USIMs from the same MNO or different MNOs in the same UE.

In order to prevent interference between a user's service preference for one USIM and an operator's service preference for another USIM, the 3GPP system may provide an appropriate security mechanism.

Each USIM may appear as a separate device in the 3GPP system.

Mobile terminated services for a Multi-USIM device may be supported.

The 3GPP system may inform the UE of information on the type of traffic that triggered paging as part of the paging procedure. This information may be used by to determine whether a user or MUSIM should respond to a mobile terminated call while the UE is engaged in active communication based on another USIM. The granularity of paging information can distinguish the following service categories:

Internet Protocol (IP) Multimedia Subsystem (IMS) based voice service and non-IMS based voice service
IMS-based Short Message Service (SMS) or Unstructured Supplementary Service Data (USSD) and non-IMS-based SMS or USSD
IMS services other than voice or SMS
Other services not listed above (e.g. data services including video)

The 3GPP system may postpone active communication. For example, when the UE needs to perform another USIM-related activity, the 3GPP system may postpone active communication.

The 3GPP system may resume the postponed communication. For example, if the UE completes another USIM-related activity, the 3GPP system may resume the postponed communication.

The 3GPP system should be able to minimize paging collisions for paging related to multiple USIMs in the UE.

Here, the paging collision may mean a situation in which paging occurrences related to a plurality of USIMs overlap in time. UEs operating with a single Rx must choose to monitor a single paging channel at a time, which may cause paging to other paging channels to fail.

The 3GPP system should provide a mechanism to minimize signaling overhead for services related to multiple USIMs of a MUSIM UE.

The 3GPP system should be able to minimize the influence of services related to one USIM on the services related to other USIMs of the MUSIM UE.

The 3GPP system provides a means for the MUSIM UE to receive an incoming call related to one USIM and switch over to the corresponding incoming call when MUSIM UE has a call related to another USIM is in progress. This requirement may not apply for passive mode MUSIM UEs.

The 3GPP system may enable a MUSIM UE to provide a voice service from one USIM and simultaneously provide a data service from another USIM. The 3GPP system can minimize the impact of a MUSIM UE on an ongoing data service related to one USIM while a user is simultaneously answering calls related to another USIM. This requirement may not applied to passive mode MUSIM UEs.

The 3GPP system can minimize unnecessary signaling and unnecessary use of resources for the MUSIM UE operating in the Dual SIM Dual Standby (DSDS) mode.

For each PLMN in which a MUSIM UE operating in DSDS mode is registered, postponement and resumption of a specific set of services may be possible.

<Paging Collision>

The paging collision may mean that two paging occasions to be monitored by the UE collide in the time domain. For example, when the UE uses a plurality of USIMs, when a paging occasion in a network related to one USIM collides with a paging occasion in a network related to another USIM, it can be said that a paging collision has occurred.

The UE may monitor paging frames and paging occasions. For example, in the case of E-UTRA, a paging frame and a paging occasions may be allocated based on IMSI.

A paging occasion may be defined, for example, as follows. A paging opportunity (Paging Occasion: PO) is a subframe in which a Paging Radio Network Temporary Identifier (P-RNTI) can be transmitted through the PDCCH.

One paging frame (PF) may be one radio frame (including one or multiple paging occasions). When Discontinuous Reception (DRX) is used, the UE only needs to monitor one PO per DRX cycle.

An example of overlapping paging opportunities will be described with reference to FIG. 7.

Figure 7:
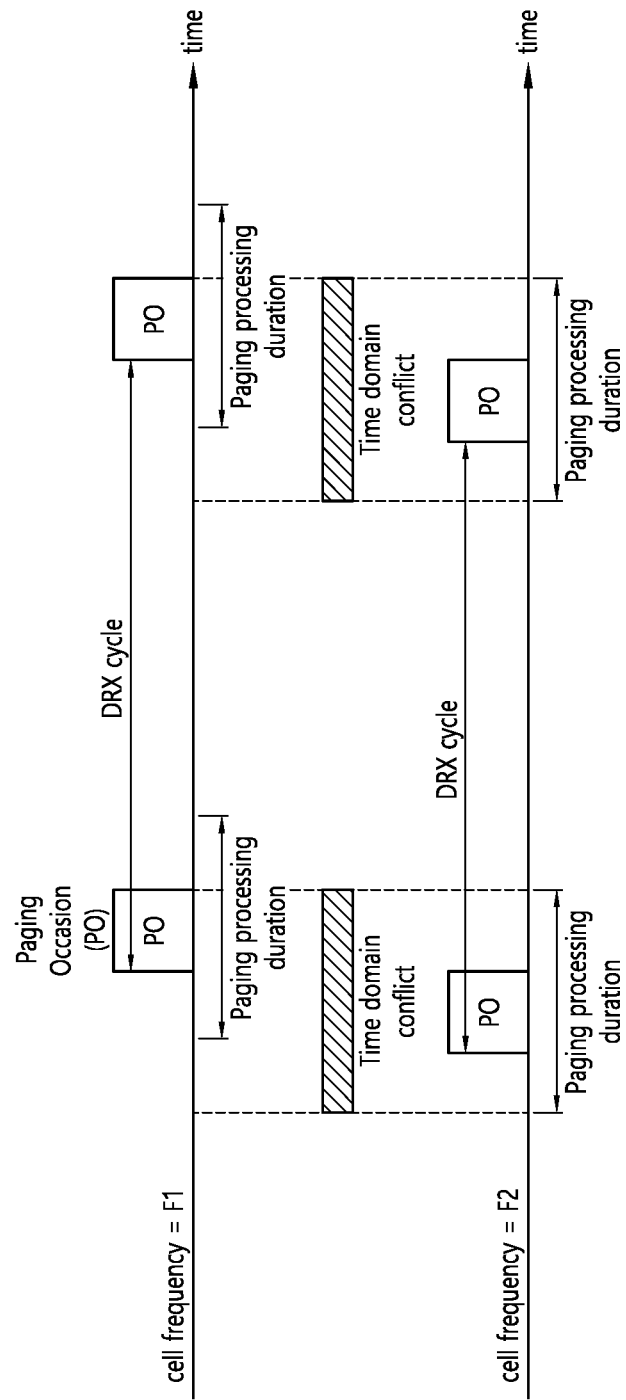
FIG. 7 is a diagram illustrating an example in which paging occasions overlap.

FIG. 7 is a diagram illustrating an example in which paging occasions overlap.

Referring to FIG. 7, the UE needs to receive services on two different frequencies (eg, F1 and F2).

For example, at frequency F1, the UE may expect to receive a paging from a first network (eg, PLMN 1). And, at frequency F2, the UE may expect to receive another communication service (eg, LTE paging, 5G paging, etc.) from the second network (eg, PLMN 2).

A UE with a single Rx chain may receive services on frequencies F1 and F2, alternating between frequencies F1 and F2.

The service at frequency F2 may be scheduled by the network for the same amount of time as the paging opportunity at frequency F1. The service at frequency F2 may have a period equal to the period of the DRX cycle at frequency F1, or may have a period that is a multiple of the period of the DRX cycle. For reference, in FIG. 7, the paging processing duration may mean a time used to process paging.

Repetitive scheduling collisions between two services may cause the UE to miss paging on frequency F1. Likewise, such a scheduling collisions may cause the UE to miss service reception (eg, paging reception) on frequency F2.

Although there is a dual subscription, a device with a single Rx chain (eg a MUSIM UE such as a dual SIM device) can register with two different networks. In both networks, the paging occasions for each subscription may occur almost simultaneously, resulting in paging collisions between subscriptions.

II. Problems to be Solved by the Disclosure of the Present Specification

In a 3GPP system (eg, 4G network, 5G network), it is basically assumed that one UE has one SIM. However, among the actually released UEs, there are UEs (eg, MUSIM UEs) supporting dual SIM or multi SIM.

In particular, in some countries, a large number of such multi-SIM UEs are released, and in some cases, they form a mainstream among UEs of the country. Since the 3GPP standard does not clearly support the operation of multi SIM UEs, these UEs are implemented in a dual standby manner to support communication based on multiple SIMs.

For example, in the dual standby method, the UE uses all of a plurality of SIMs (eg, two SIMs) to perform a registration procedure for networks related to each SIM, and then switches radios as necessary to provide networks and services.

In this method, in general, the UE is implemented so that the user sets which service to be provided through which SIM. For example, the user may set the SMS to be provided through the first SIM and the voice call to be provided through the second SIM. Therefore, the UE may switch the radio based on the user's setting.

In the case of mobile originating (MO) traffic, the UE may operate based on the user's settings as described above. However, in the case of Mobile Terminated (MT) traffic, a problem may occur.

For example, in a situation in which the UE includes two SIMs (eg, a first SIM associated with PLMN 1 and a second SIM associated with PLMN 2), the UE may register with PLMN 1 and PLMN 2 based on the respective SIMs.

In this case, the UE needs to monitor both paging of PLMN 1 and PLMN 2 in the idle state, when the paging occasion of PLMN 1 and the paging occasion of PLMN 2 overlap (overlapping), the UE may monitor only one PLMN at a time.

For this reason, in a situation where the user needs to be provided with an important service (eg, a phone call), a situation may occur in which the UE is not provided with an important service while monitoring another PLMN. For example, if data traffic for a mobile terminating service (eg, voice call) occurs in PLMN 2 while the UE is monitoring the paging opportunity of PLMN 1, the UE cannot receive the mobile terminating service of PLMN 2 may occur.

In addition to these problems, while the UE is receiving the service from PLMN 1, since the UE cannot perform paging monitoring for PLMN 2, there is a problem that the UE does not respond to paging occurring in PLMN 2. In this case, since the network node of PLMN 2 repeatedly performs paging transmission, a problem in which paging resources are wasted may occur.

In addition, when the UE continuously communicates in a connected state in one PLMN (eg, PLMN 1), the UE cannot perform a registration update in PLMN 2. Since the UE cannot perform registration update in PLMN 2, deregistration may occur or mobility registration may not be properly performed. Due to this, a problem may occur in that the location of the UE is not properly determined in the network (eg, PLMN 2).

In a situation in which the terminal is receiving service from PLMN 1, MT service for the terminal may occur in PLMN 2. In this case, even if the terminal succeeds in monitoring the PLMN 2, conventionally the terminal can only recognize the fact that the MT service has occurred in the PLMN 2. That is, there is a problem that the terminal does not know information about the MT service generated in PLMN 2 (eg, a caller's phone number, an SMS origination phone number, etc.), and only recognizes the fact that the service has occurred in PLMN 2. For this reason, the terminal could not provide information about the service generated in PLMN 2 to the user. There is a problem in that the terminal and/or the user must determine whether to receive the service from the PLMN 2 without specifically knowing information about the service generated from the PLMN 2.

In order to solve the above problems, it is necessary to discuss a method for efficiently supporting a terminal using a plurality of SIMs.

III. Disclosure of the Present Specification

The disclosures described below in this specification may be implemented in one or more combinations. Each of the drawings shows an embodiment of each disclosure, but the embodiments of the drawings may be implemented in combination with each other.

A UE having a plurality of Subscriber Identity Modules (SIMs) (eg, a plurality of USIMs) may operate as described below. For reference, in the disclosure of this specification, the operation of the UE and the network node (eg, UPF, N3IWF, AMF, SMF, etc.) is described by taking the case where the UE has two SIMs as an example, but this is only an example, and in the following The description can be applied even when the UE has three or more SIMs.

Hereinafter, the UE may include SIM 1 (first SIM or SIM A) related to PLMN 1 (first PLMN, or PLMN A) and SIM 2 (second SIM or SIM B) related to PLMN 2 (second PLMN or PLMN B). That is, the terminal may perform communication in PLMN 1 (first PLMN, or PLMN A) and/or PLMN 2 (second PLMN or PLMN B), based on SIM 1 (first SIM or SIM A) and SIM 2 (second SIM or SIM B). For example, the terminal may receive service from PLMN 1 using SIM 1, and the terminal may receive service from PLMN 2 using SIM 2. Although it is assumed that SIM 1 and SIM 2 can connect to different PLMNs, this is only an example, and SIM 1 and SIM 2 may be SIMs related to the same PLMN.

A method in which the terminal and/or the network provides the user with information (eg, a caller's phone number, an caller's phone number of SMS, etc.) about a service generated in PLMN 2 to the user will be described. For example, when the terminal is receiving service from a specific PLMN (eg, PLMN 1), when a service for the terminal occurs in another PLMN (eg, PLMN 2) (eg, when data about the terminal occurs), a method in which the network provides information about service (eg, caller information of the service generated in PLMN 2) to the UE will be described. If the terminal and/or the user can determine whether to receive the service by moving to the PLMN 2 based on information about the service (eg, caller information of the service generated in PLMN 2), the user experience can be improved.

Several methods of the disclosure of the present specification to be described below (eg, the first disclosure of the present specification (including the first to fifth examples) and the second disclosure of the present specification (including the first and second examples) can be implemented by one or more combination of the above.

For reference, in the examples of FIGS. 8A to 15B below, communication that a terminal (eg, UE) perform with network nodes (eg, AMF, SMF, UPF, UDM, HSS, PCF, P-CSCF, S-CSCF, SMSF, SMS-GMSC, NEF, MUSIM AS, etc.) may be performed through a base station (eg, RAN (Radio Access Network). For example, when the terminal transmits a message to the network node, the terminal may transmit the message to the base station, and the base station may transmit the message to the network node. As another example, when the network node transmits a message to the terminal, the network node may transmit the message to the base station, and the base station may transmit the message to the terminal.

1. First Disclosure of the Present Specification

In the first disclosure of the present specification, a method for performing communication (eg, a method of receiving information about a service) related to information about a service (eg, caller information of a service occurring in a PLMN other than the PLMN in which the terminal currently performs the service) using an application server (AS) related to a plurality of SIMs (eg, MUSIM) will be described. Hereinafter, an application server (AS) related to a plurality of SIMs (eg, MUSIM) may be referred to as a MUSIM AS.

1-1. A First Example of a First Disclosure of the Present Specification

In a first example of the first disclosure of the present specification, a method of receiving caller information (eg, caller ID) using MUSIM AS is described. In a first example of the first disclosure of the present specification, a method of receiving caller information (eg, caller ID) using MUSIM AS is described with a focus on the operation of the SMF node.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 8A:
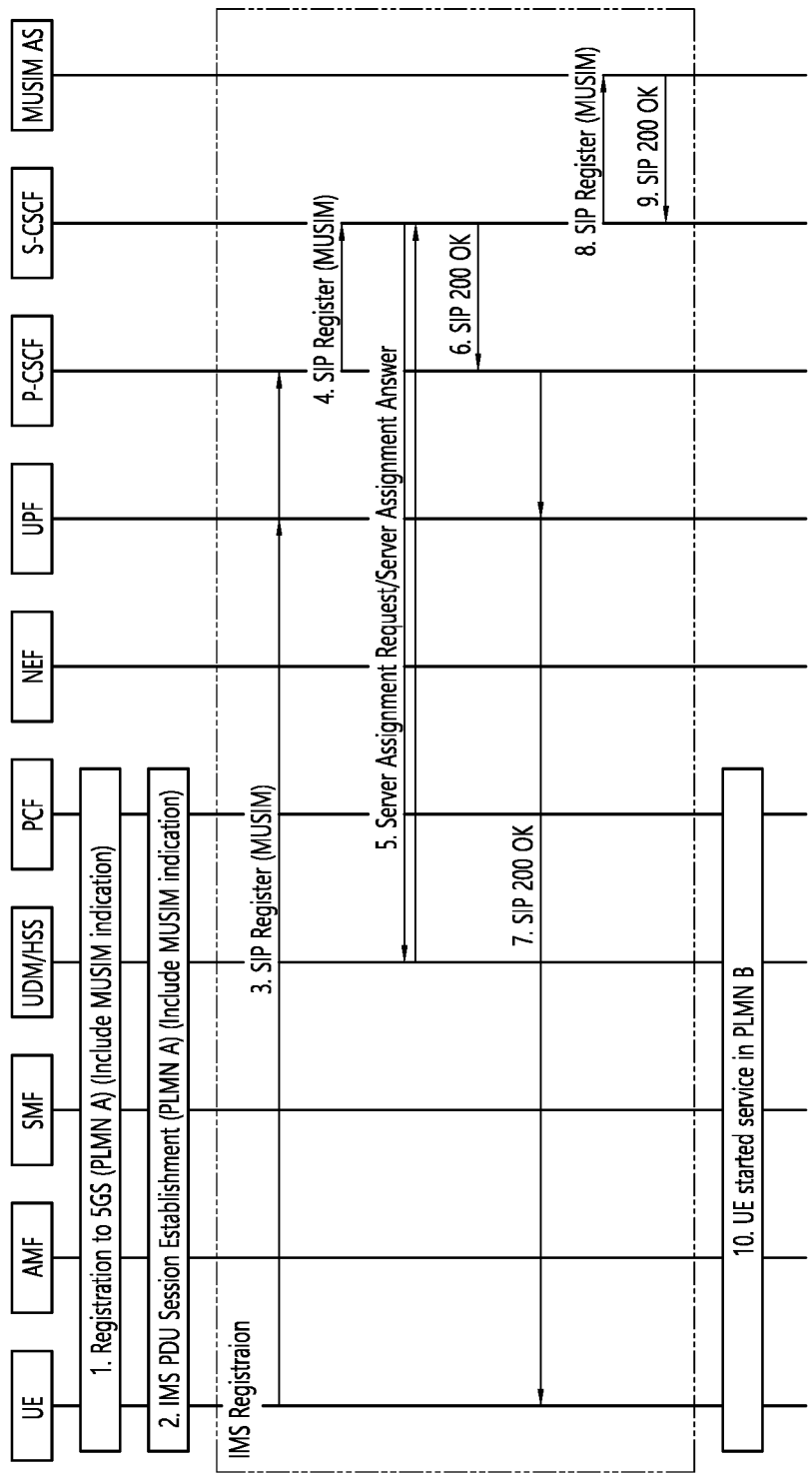
FIGS. 8a to 8c are diagrams illustrating examples of a signal flow diagram according to a first example of the first disclosure of the present specification.
Figure 8B:
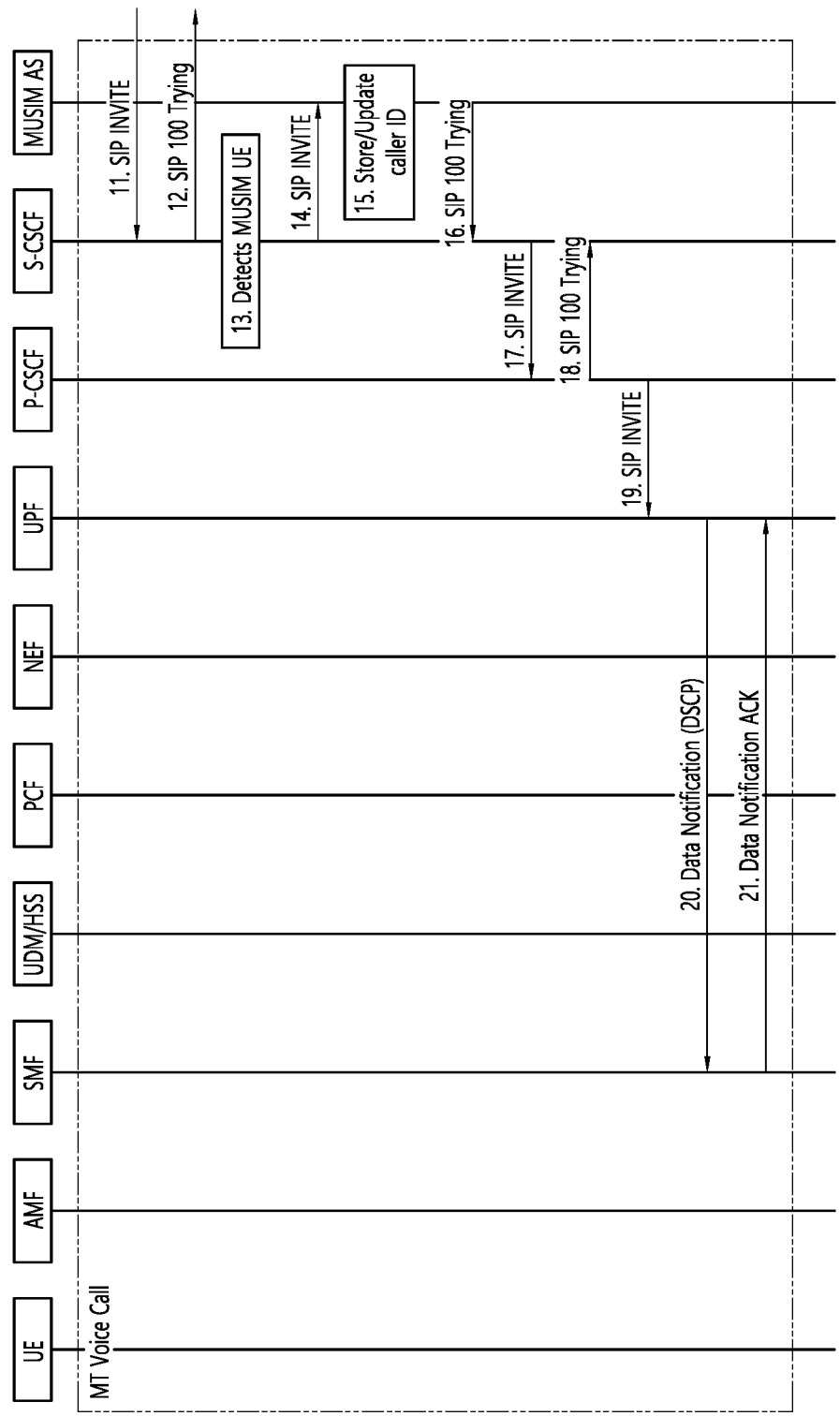
Figure 8C:
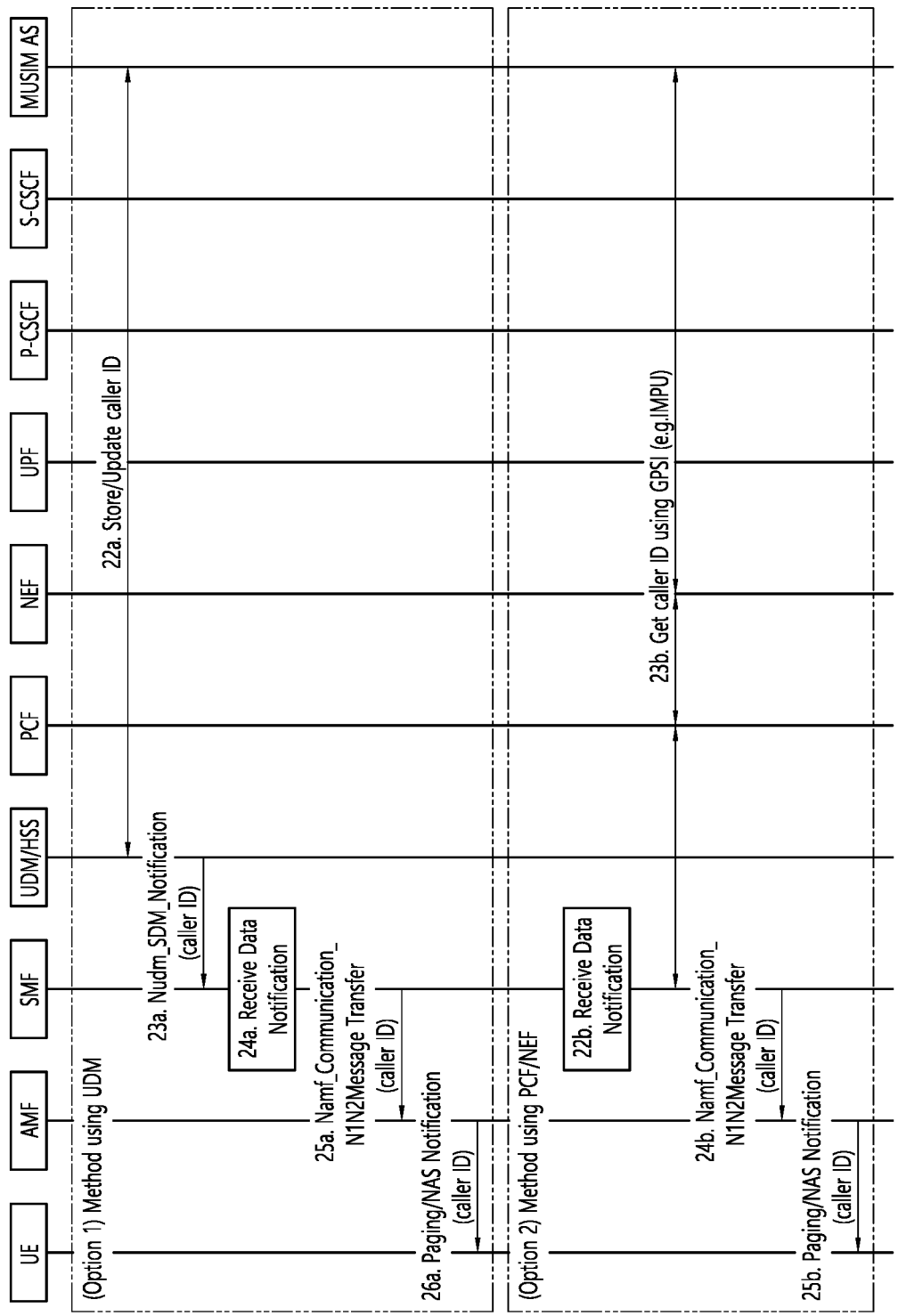

FIGS. 8a to 8c are diagrams illustrating examples of a signal flow diagram according to a first example of the first disclosure of the present specification.

1) A terminal (eg, UE) may perform a registration procedure for a 5G network (eg, 5GS) of PLMN A. The terminal may transmit a registration request message for the 5G network of PLMN A to the AMF node by using SIM A. The terminal may transmit the registration request message by including the MUSIM indication (or information) in the registration request message. Here, the MUSIM indication (or information) may be information indicating that the terminal uses a plurality of SIMs or information indicating that the registration procedure is related to the plurality of SIMs. Upon receiving the MUSIM indication from the terminal, the AMF may store that the terminal performs a MUSIM-related operation. Here, the MUSIM-related operation may mean performing communication based on a plurality of SIMs. After receiving the registration request message from the terminal, the AMF may transmit a registration acceptance message to the terminal. The AMF may include information about whether the AMF can perform MUSIM-related operations (eg, whether the AMF can perform MUSIM-based communication) in the registration accept message and transmit it to the terminal.

2) After the UE performs the registration procedure for PLMN A, the UE may perform a procedure for establishing (or generating) an IMS PDU session for an IMS service (eg, voice service, video service, Short Message Service (SMS) over IP service, etc.). In the IMS PDU session establishment procedure, the terminal may transmit a MUSIM indication. For example, the terminal may transmit the PDU session establishment request message to the AMF via the RAN, and the AMF may transmit the PDU session establishment request message to the SMF. The UE may transmit a PDU session establishment request message by including a MUSIM indication in the PDU session establishment request message. Upon receiving the MUSIM indication, the SMF may store that the terminal performs a MUSIM-related operation. After receiving the PDU session establishment request message from the terminal, the SMF may transmit a PDU session establishment accept message to the terminal. The SMF may include information on whether the SMF can perform a MUSIM-related operation (eg, whether the SMF can perform MUSIM-based communication) in the PDU session establishment accept message and transmit it to the UE. For reference, only when the terminal receives the information that the MUSIM-related operation is allowed through the registration message transmitted by the AMF in step 1), the terminal may transmit a MUSIM indication to the SMF.

3) After the terminal establishes (or generates) an IMS PDU session, it may perform an IMS registration procedure. Here, in the IMS registration procedure may be a procedure that the terminal registers the network nodes included in the IMS network (eg, Proxy Call Session Control Function (P-CSCF), Serving Call Session Control Function (S-CSCF), MUSIM Application Server (AS)). The terminal may transmit a Session Initiation Protocol (SIP) register message to the P-CSCF through the UPF. The terminal may inform that the terminal performs MUSIM-related operations by including the MUSIM indication in the SIP register message and transmitting the SIP register message to the P-CSCF.

4) P-CSCF may transmit SIP register message to S-CSCF. A MUSIM indication may also be included in the SIP message (eg, SIP register message) transmitted from the P-CSCF to the S-CSCF.

5) S-CSCF may obtain subscriber information of the terminal from UDM/HSS (UDM or HSS). For example, the S-CSCF may transmit a server assignment request message to the UDM/HSS to request subscriber information of the terminal. Then, the UDM/HSS may transmit the subscriber information of the terminal by transmitting a server assignment answer message to the S-CSCF. The subscriber information of the terminal may include TAS (Telephony Application Server) information. The TAS information may include information related to MUSIM AS. For example, the information related to the MUSIM AS may include address information (eg, SIP Uniform Resource Locator (URL)) of the MUSIM AS.

6 to 7) The S-CSCF may transmit the SIP 200 OK message to the terminal via the P-CSCF. The SIP 200 OK message may be a response message to the SIP Register message transmitted by the UE in step 3). The S-CSCF may notify that the IMS registration is completed by transmitting a SIP 200 OK message to the terminal.

8) When the S-CSCF receives the MUSIM indication in step 4), the S-CSCF may transmit a SIP register message to the MUSIM AS based on the subscriber information received in step 5). For example, the S-CSCF may identify the MUSIM AS to which the SIP register message is to be transmitted, based on the TAS information (including information related to the MUSIM AS). The SIP register message may include a MUSIM indication.

9) The MUSIM AS may transmit the SIP 200 OK message to the S-CSCF after creating the context of the corresponding terminal. For example, the MUSIM AS may store the IP Multimedia Public Identity (IMPU) of the terminal, IP address information, and the like in the context of the terminal.

10) The UE may start a service using another SIM (eg, SIM (SIM B) other than SIM A) in another PLMN (eg, PLMN B) or in the same PLMN (eg, PLMN A). For example, the operations performed in steps 1) to 9) may be operations performed in PLMN A related to SIM A included in the terminal, and in step 10), the terminal may perform a service using SIM B.

11) A Mobile Terminated (MT) call from PLMN A to the terminal is started, and the S-CSCF may receive a SIP INVITE message. The S-CSCF may receive the SIP INVITE message from the originating S-CSCF (ie, the S-CSCF of the caller). Although the MT voice call is shown in FIGS. 8A to 8C, this is only an example, and the MT call to the terminal may include all of various IMS services such as a video call and SMS over IP.

12) The S-CSCF may transmit the SIP 100 Trying message to the originating S-CSCF. The SIP 100 Trying message may be a message indicating that the SIP INVITE message received in step 11) is to be processed.

13 to 14) The S-CSCF may know (or may determine) that the terminal performs a MUSIM-related operation based on the MUSIM indication received in step 4). Accordingly, the S-CSCF may transmit the SIP INVITE message for the terminal to the MUSIM AS.

15) MUSIM AS may obtain ID information (eg, caller ID such as phone number) of a person (or terminal) (ie, caller) making a call based on the SIP INVITE message, and store the ID information. If the MUSIM AS has previously stored the ID information (eg, caller ID such as a phone number) of the person (or terminal) (that is, the caller) making the call, the MUSIM AS may update the stored ID information with the newly acquired ID information.

16) MUSIM AS may transmit the SIP 100 Trying message to the S-CSCF after storing the caller's ID information.

17 to 18) The S-CSCF may transmit a SIP INVITE message to the P-CSCF. The P-CSCF may transmit a SIP 100 Trying message to the S-CSCF.

19) The P-CSCF may transmit a SIP INVITE message to the UPF. In this process, the P-CSCF may transmit the SIP INVITE message to the UPF using a specific Differentiated Service Code Point (DSCP) value set by an operator. The UPF may detect a specific DSCP value from an IP packet that transmits the SIP INVITE message. Then, the UPF may transmit the DSCP value to the SMF through step 20) below.

20) The UPF may transmit a Data Notification message to the SMF when the PDU session of the UE (eg, the IMS PDU session related to the MT call) is deactivated. The UPF may transmit the data notification message to the SMF by including the DSCP value set by the P-CSCF in the data notification message. The UPF may transmit information about what type of MT service the MT call started in step 11) is in the data notification message to the SMF. The SMF may recognize that an MT call to the terminal is started based on the DSCP value received from the UPF. By recognizing that the MT call to the terminal is started, the SMF may perform operations to be described in Option 1 and Option 2 below.

21) The SMF may transmit a data notification Ack message to the UPF to inform the UPF that the data notification message has been successfully received.

After step 21), any one of the operations corresponding to Option 1 or Option 2 shown in FIGS. 8A to 8C may be performed. The operations of Option 1 will be described first.

Option 1 includes operations for performing communication related to the caller's ID information through UDM.

22a) The MUSIM AS may transmit the caller ID information (eg, caller ID information) received through the SIP INVITE message in step 15) to the UDM or HSS. Then, the UDM or HSS may store the caller's ID information (eg, caller ID information). For reference, the MUSIM AS performs step 16) after the UDM or HSS finishes the procedure for storing the caller's ID information, so that the SMF may receive stored (or updated) caller's ID information before step the data notification message of step 20) is received.

23a) Since data stored in the UDM or HSS (eg, subscriber information) has been updated, the UDM or HSS may transmit the updated subscriber information to the SMF. For reference, in step 22a), the UDM or HSS may store the caller's ID information received from the MUSIM AS as subscriber information of the terminal. Accordingly, the updated subscriber information may include the caller's ID information transmitted by the MUSIM AS.

24a and 25a) The SMF may receive the data notification message of step 20) from the UPF. Upon receiving the data notification message, the SMF may transmit a request message (eg, a Namf_Communication_N1N2MessageTransfer message) to the AMF. The request message (eg, Namf_Communication_N1N2MessageTransfer message) may include information for activating the PDU Session of the UE. The SMF may transmit the Namf_Communication_N1N2MessageTransfer message by including the caller's ID information in the Namf_Communication_N1N2- MessageTransfer message. For reference, the SMF may perform the operations described in steps 24a and 25a only when the terminal transmits the IMS PDU session establishment request message including the MUSIM indication in step 2).

26a) Since the AMF has received a request message (eg, Namf_Communication_N1N2MessageTransfer message) from the SMF, it may transmit a paging message or a Non Access Stratum (NAS) notification message to the UE. The paging message or NAS notification message may include information that downlink data for the terminal (eg, downlink data related to IMS service) exists. When the AMF receives the caller's ID information from the SMF, the AMF may transmit the paging message or NAS notification message to the terminal by including the caller's ID information in the paging message or NAS notification message. The AMF may perform the operation of step 26) only when the terminal transmits a registration request message including a MUSIM indication in step 1). The terminal may determine whether to receive a service from PLMN A (eg, to perform an MT call from PLMN A) based on the received caller's ID information. In this case, the terminal may inform the user of information related to the caller's phone number and ask whether to receive the call. Alternatively, the terminal may determine whether or not to receive a call based on a setting previously designated by the user. For example, when the user sets to receive only a specific group or phone number based on a contact stored in the terminal, the terminal may determine whether to receive it based on this. When the terminal decides to receive a service from PLMN A, the terminal may perform a service request procedure from PLMN A.

Option 2 includes operations for performing communication related to the caller's ID information through PCF and/or Network Exposure Function (NEF).

22b) In step 20), the SMF may receive a data notification message from the UPF.

23b) The SMF may obtain the caller's ID information from the MUSIM AS through the PCF and/or the NEF. For example, the SMF may transmit a request message for requesting ID information of the caller to the MUSIM AS via the PCF and/or NEF, and the MUSIM AS may transmit a response message including the ID information of the caller to the SMF via the PCF and/or NEF. In this case, the SMF may obtain information related to the MUSIM AS based on the subscriber information stored in the UDM or HSS. The operation of step 23b) may be performed only when the terminal transmits an IMS PDU session establishment request message including a MUSIM indication in step 2). The terminal information used by the SMF to obtain the caller's ID information from the MUSIM AS may be the IP address and/or Generic Public Subscription Identifier (GPSI) (eg, IP Multimedia PUblic identity (IMPU)), etc, used in the PDU session of the terminal. That is, the SMF may request phone number information on the MT call of the terminal matching the GPSI to the MUSIM AS through PCF/NEF using the GPSI of the terminal. The MUSIM AS finds out caller information of the phone service received for the terminal matching the GPSI requested by the AMF, based on the context information of the terminal created in step 8) and the information stored in step 15), and informs caller information of the phone service received for the terminal to the SMF.

24b) The SMF may transmit a request message (eg, a Namf_Communication_N1N2MessageTransfer message) to the AMF. The request message (eg, Namf_Communication_N1N2MessageTransfer message) may include information for activating the PDU Session of the UE. The SMF may transmit the Namf_Communication_N1N2MessageTransfer message by including the caller's ID information in the Namf_Communication_N1N2MessageTransfer message. For reference, the SMF may perform the operation of 24b) only when the terminal transmits the IMS PDU session establishment request message including the MUSIM indication in step 2).

25b) Since the AMF has received a request message (eg, Namf_Communication_N1N2MessageTransfer message) from the SMF, it may transmit a paging message or a Non Access Stratum (NAS) notification message to the UE. The paging message or NAS notification message may include information that downlink data for the terminal (eg, downlink data related to IMS service) exists. When the AMF receives the caller's ID information from the SMF, the AMF may transmit the paging message or NAS notification message to the terminal by including the caller's ID information in the paging message or NAS notification message. The AMF may perform the operation of step 26) only when the terminal transmits a registration request message including a MUSIM indication in step 1). The terminal may determine whether to receive a service from PLMN A (eg, to perform an MT call from PLMN A) based on the received caller's ID information. In this case, the terminal may inform the user of information related to the caller's phone number and ask whether to receive the call. Alternatively, the terminal may determine whether or not to receive a call based on a setting previously designated by the user. For example, when the user sets to receive only a specific group or phone number based on a contact stored in the terminal, the terminal may determine whether to receive it based on this. When the terminal decides to receive a service from PLMN A, the terminal may perform a service request procedure from PLMN A.

1-2. Second Example of the First Disclosure of the Present Specification

A second example of the first disclosure of the present specification describes a method of receiving caller information (eg, caller ID) using MUSIM AS. In the second example of the first disclosure of the present specification, a method of receiving caller information (eg, caller ID) using MUSIM AS with a focus on the operation of the AMF node will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 9:
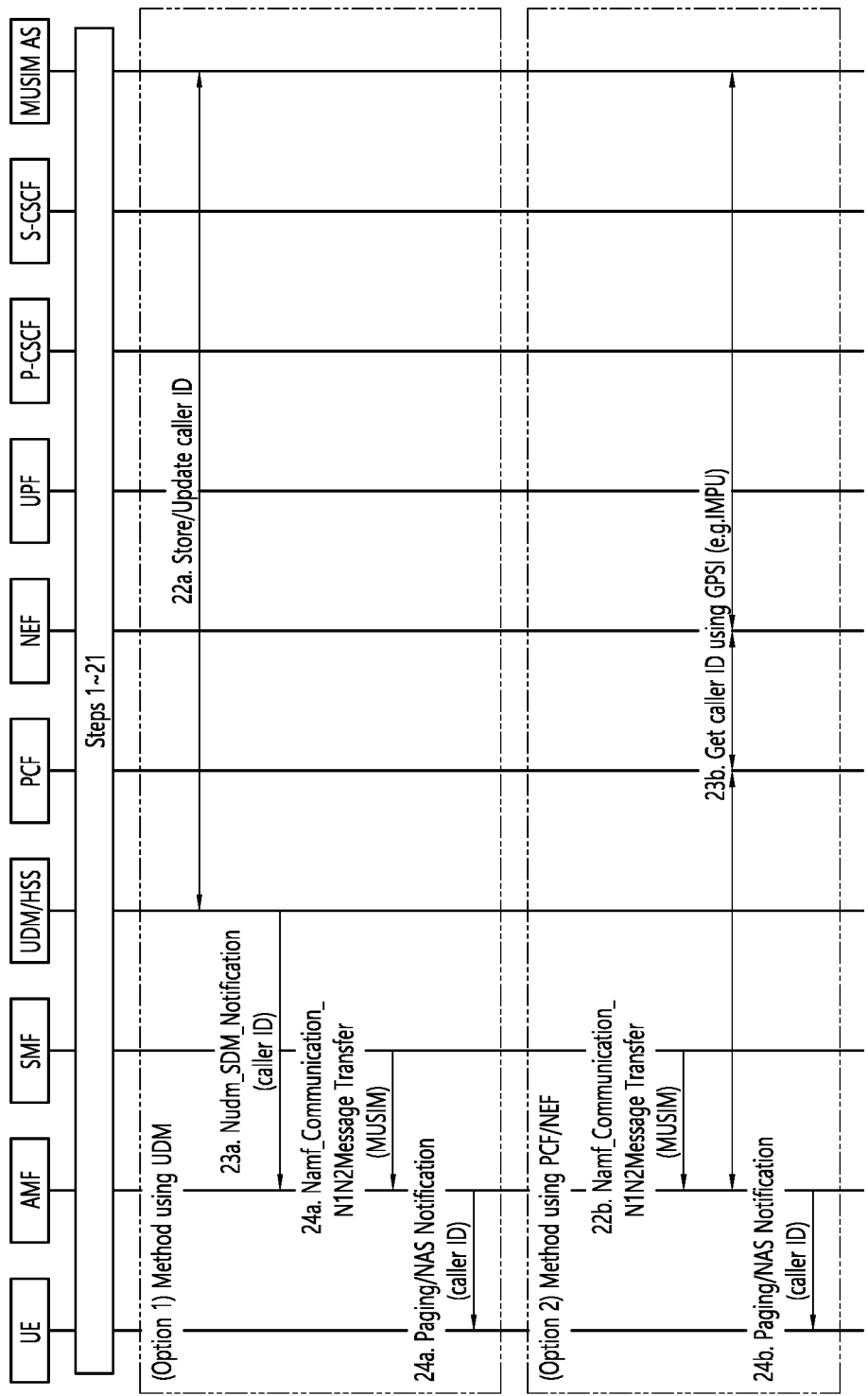
FIG. 9 is a diagram illustrating an example of a signal flow diagram according to a second example of the first disclosure of the present specification.

FIG. 9 is a diagram illustrating an example of a signal flow diagram according to a second example of the first disclosure of the present specification.

Steps 1 to 21 shown in FIG. 9 are the same as steps 1 to 21 described with reference to FIGS. 8A to 8C. That is, steps 1 to 21 illustrated in FIG. 9 may be performed in the same manner as steps 1 to 21 described with reference to FIGS. 8A to 8C. In other words, the example of FIG. 9 shows a signal flow diagram after steps 1 to 21 described with reference to FIGS. 8A to 8C are performed.

After step 21), any one of the operations corresponding to Option 1 or Option 2 shown in FIG. 9 may be performed. The operations of Option 1 will be described first.

Option 1 includes operations for performing communication related to the caller's ID information through UDM.

22a) The MUSIM AS may transmit the caller ID information (eg, caller ID information) received through the SIP INVITE message in step 15) to the UDM or HSS. Then, the UDM or HSS may store the caller's ID information. For reference, the MUSIM AS may perform step 16) of FIGS. 8a to 8c after the UDM or HSS ends the procedure for storing the caller's ID information, so that the AMF may receive stored (or updated) caller's ID information before request message (eg, Namf_Communication_N1N2MessageTransfer message) of step 24a).

23a) Since data stored in the UDM or HSS (eg, subscriber information) has been updated, the UDM or HSS may transmit the updated subscriber information to the AMF. For reference, in step 22a), the UDM or HSS may store the caller's ID information received from the MUSIM AS as subscriber information of the terminal. Accordingly, the updated subscriber information may include the caller's ID information transmitted by the MUSIM AS.

24a) The SMF may receive the data notification message from the UPF in step 20) of FIGS. 8A to 8C. After receiving the data notification message, the SMF may transmit a request message (eg, Namf_Communication_N1N2-MessageTransfer message) to the AMF. The request message (eg, Namf_Communication_N1N2MessageTransfer message) may include information for activating the PDU Session of the UE. In this case, the SMF may include a MUSIM Indication indicating that the corresponding terminal (eg, UE) performs a MUSIM-related operation in the request message (eg, Namf_Communication_ N1N2- MessageTransfer message) and transmit it to the AMF. The SMF may perform the operation of step 24a) only when the terminal transmits an IMS PDU session establishment request message including a MUSIM indication in step 2) of FIGS. 8*a* to 8*c*.

25a) Since the AMF has received the request message (eg, Namf_Communication_N1N2MessageTransfer message) from the SMF, it may transmit a paging message or a Non Access Stratum (NAS) notification message to the UE. The paging message or NAS notification message may include information that downlink data for the terminal (eg, downlink data related to IMS service) exists. The AMF may transmit the paging message or NAS notification message to the terminal by including the caller's ID information in the paging message or NAS notification message. The AMF may perform the operation of step 26) only when the terminal transmits a registration request message including a MUSIM indication in step 1) of FIGS. 8*a* to 8*c*. The terminal may determine whether to receive a service from PLMN A (eg, to perform an MT call from PLMN A) based on the received caller's ID information. In this case, the terminal may inform the user of information related to the caller's phone number and ask whether to receive the call. Alternatively, the terminal may determine whether or not to receive a call based on a setting previously designated by the user. For example, when the user sets to receive only a specific group or phone number based on a contact stored in the terminal, the terminal may determine whether to receive the call based on this setting. When the terminal decides to receive a service from PLMN A, the terminal may perform a service request procedure in PLMN A.

Option 2 includes operations for performing communication related to the caller's ID information through PCF and/or NEF.

22b) The SMF may receive a data notification message from the UPF in steps 20 of FIGS. 8A to 8C, and the SMF may transmit a request message (eg, a Namf_Communication_ N1N2MessageTransfer message) to the AMF. The request message (eg, Namf_Communication_N1N2- MessageTransfer message) may include information indicating that downlink data for the UE exists. In this case, the SMF may include a MUSIM Indication indicating that the corresponding terminal (eg, UE) performs a MUSIM-related operation in the request message (eg, Namf_Communication_ N1N2MessageTransfer message) and transmit it to the AMF. The SMF may perform the operation of step 22b) only when the terminal transmits an IMS PDU session establishment request message including a MUSIM indication in step 2) of FIGS. 8*a* to 8*c*.

23b) AMF may acquire the caller's ID information from MUSIM AS through PCF and/or NEF. For example, the AMF transmits a request message requesting ID information of the caller to the MUSIM AS via the PCF and/or NEF, and the MUSIM AS may transmit a response message including the ID information of the caller to the AMF via the PCF and/or NEF. In this case, the AMF may obtain information related to the MUSIM AS based on the subscriber information stored in the UDM or HSS. The operation of step 23b) may be performed only when the terminal transmits an IMS PDU session establishment request message including a MUSIM indication in step 2) of FIGS. 8*a* to 8*c*. The terminal information used by the AMF to obtain the caller's ID information from the MUSIM AS may be an IP address/ GPSI (eg, IMPU) used in the PDU session of the terminal. That is, the SMF may request phone number information on the MT call of the terminal matching the GPSI to the MUSIM AS through PCF/NEF using the GPSI of the terminal. The MUSIM AS finds out caller information of the phone service received for the terminal matching the GPSI requested by the AMF based on the context information of the terminal created in step 8) and the information stored in step 15) and informs the SMF.

24b) Since the AMF has received the request message (eg, Namf_Communication_N1N2MessageTransfer message) from the SMF, it may transmit a paging message or a NAS notification message to the terminal. The paging message or NAS notification message may include information that downlink data for the terminal (eg, downlink data related to IMS service) exists. The AMF may transmit the paging message or NAS notification message to the terminal by including the caller's ID information (eg, stored (or updated) caller's ID information) in the paging message or NAS notification message. When the terminal transmits a registration request message including a MUSIM indication in step 1) of FIGS. 8*a* to 8*c* and/or when the SMF transmits a MUSIM indication in step 22), the AMF may perform the operation of step 24b). The terminal may determine whether to receive a service from PLMN A (eg, to perform an MT call from PLMN A) based on the received caller's ID information. In this case, the terminal may inform the user of information related to the caller's phone number and ask whether to receive the call. Alternatively, the terminal may determine whether or not to receive a call based on a setting previously designated by the user. For example, when the user sets to receive only a specific group or phone number based on a contact stored in the terminal, the terminal may determine whether to receive the call based on this. When the terminal decides to receive a service from PLMN A, the terminal may perform a service request procedure from PLMN A.

1-3. Third Example of the First Disclosure of the Present Specification

In a third example of the first disclosure of the present specification, a method for receiving SMS caller information (eg, caller ID) using MUSIM AS is described.

1) In case of SMS using IMS

The operations described in Option 1 and 2 of the first example of the first disclosure of the present specification and Option 1 and 2 of the second example of the first disclosure described above are not only can be applied to the case of an MT voice call, but also can be applied as the same to the case of MT SMS via IMS. That is, when the SMS using IMS is started, the operations described above with reference to FIGS. 8A to 8C and FIG. 9 may be performed.

For example, when MT SMS using IMS is started, in step 11) of FIGS. 8A to 8C, the S-CSCF may receive a SIP MESSAGE instead of a SIP INVITE message. Then, the S-CSCF may transmit the SIP MESSAGE to the MUSIM AS in step 14) of FIGS. 8A to 8C. Then, the MUSIM AS may acquire ID information (eg, caller ID such as a phone number) of the person (or terminal) (ie, the caller) making the call based on the SIP MESSAGE. In this case, in order for the MUSIM AS to obtain the caller's ID information from the SIP MESSAGE, the MUSIM AS must support the SMS protocol stack.

2) In case of SMS using NAS

Hereinafter, a method of supporting SMS (SMS over NAS) using MUSIM AS with a focus on the operation of the AMF node will be described. For example, a method of receiving SMS sender information (eg, caller ID) using MUSIM AS will be described focusing on the operation of the AMF node.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
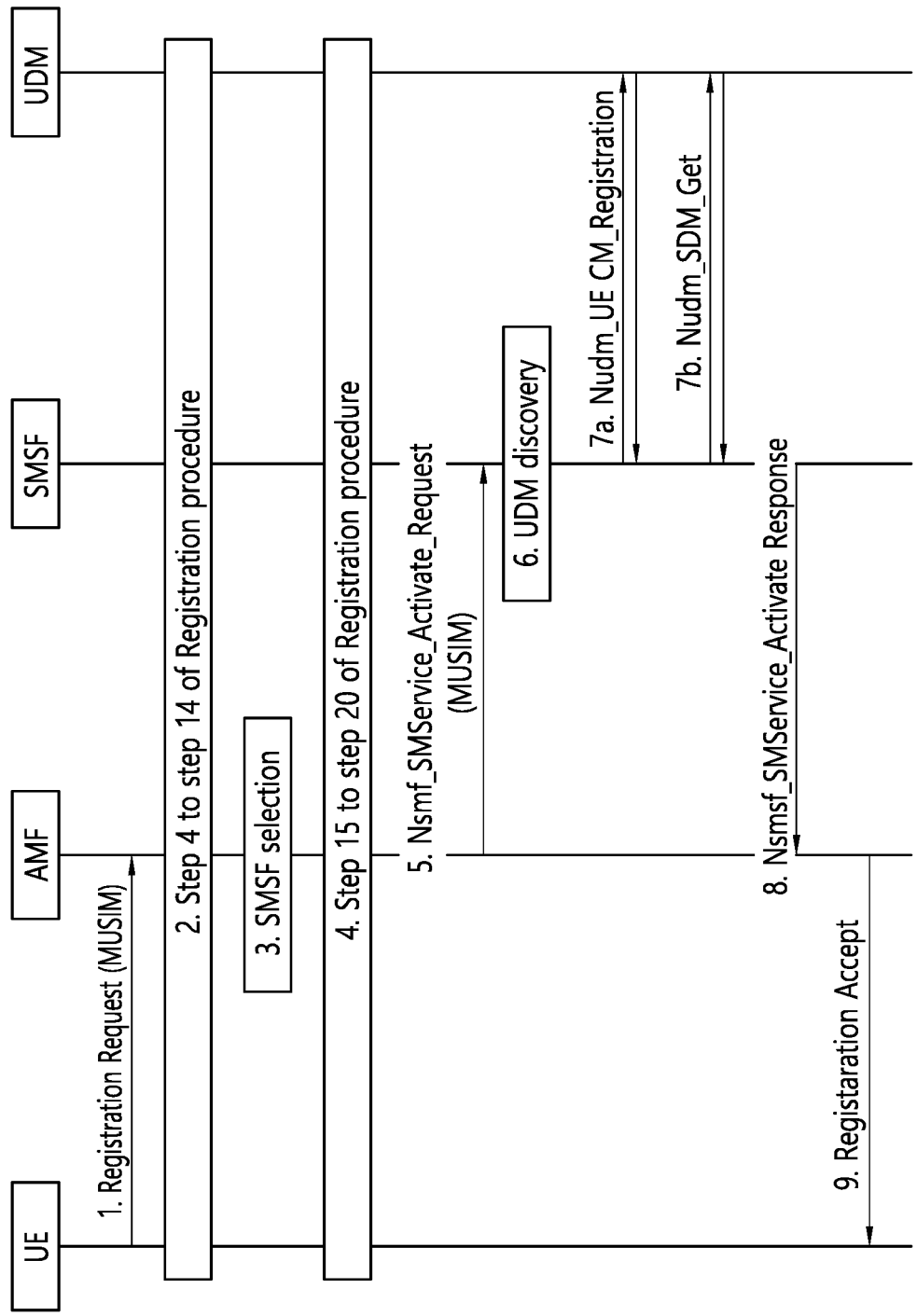
FIG. 10 is a diagram illustrating an example of a registration procedure according to a third example of the first disclosure of the present specification.

FIG. 10 is a diagram illustrating an example of a registration procedure according to a third example of the first disclosure of the present specification.

1) The terminal (eg, UE) may transmit a registration request message including a MUSIM indication to the AMF. For example, the UE may transmit a registration request message for the 5G network of PLMN A to the AMF node by using SIM A.

2) The terminal, AMF, SMSF, and UDM may perform a registration procedure (eg, steps 4 to 14 of FIGS. 5A and 5B).

3) The AMF may perform the procedure for selecting the SMSF. In a procedure for selecting an SMSF, the AMF may select an SMSF supporting a MUSIM-related operation based on the MUSIM indication received from the terminal. Here, the MUSIM-related operation may mean performing communication based on a plurality of SIMs.

4) The UE, AMF, SMSF, and UDM may perform a registration procedure (eg, steps 15 to 20 of FIGS. 5A and 5B).

5) The AMF may transmit an activation request message (eg, Nsmf_SMService_Activate_Request) to the SMSF. When the terminal transmits the registration request message including the MUSIM indication in step 1), the AMF may include the MUSIM indication in the activation request message (eg, Nsmf_SMService_Activate_Request) and transmit it to the SMSF.

6, 7a, and 7b) SMSF may perform a UDM discovery procedure. When the SMSF discovers the UDM, it may perform a registration procedure for the UDM. For example, the SMSF may perform the registration procedure with the UDM through the UDM and a registration-related message (eg, Nudm_UECM_Registration message). The Nudm_UECM_Registration message may be a message for Nudm UE Context Management (UECM) registration (Nudm_UECM_Registration). In addition, the SMSF may obtain subscriber information of the terminal from the UDM. For example, the SMSF may obtain subscriber information of the terminal from the UDM through a message (eg, Nudm_SDM_Get message).

8) The SMSF may transmit a response message (eg, Nsmf_SMService_Activate Response message) to the activation request message (eg, Nsmf_SMService_Activate_Request) received in step 5) to the AMF. The SMSF may transmit a response message to the AMF by including information on whether MUSIM-related operations are allowed in a response message (eg, Nsmf_SMService_Activate Response message). Through this, the SMSF may inform the AMF of whether a MUSIM-related operation is allowed.

9) AMF may transmit a registration accept message to the terminal. The AMF may inform the terminal whether a MUSIM-related operation is possible through a registration accept message. That is, the AMF may include information on whether a MUSIM-related operation is possible in the registration accept message and transmit it to the terminal.

After the terminal completes the registration procedure for the SMSF, when the MT SMS for the terminal arrives, the AMF may perform communication related to the caller information of the MT SMS through the operations illustrated in the example of FIG. 11 below. For example, after the terminal completes the registration procedure for the SMSF of PLMN A (SIM A related PLMN), in a situation in which the terminal performs a service in the SIM B-related PLMN (eg, PLMN B), the terminal the MT SMS for the terminal is received in PLMN A, the operations shown in the example of FIG. 11 below may be performed.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
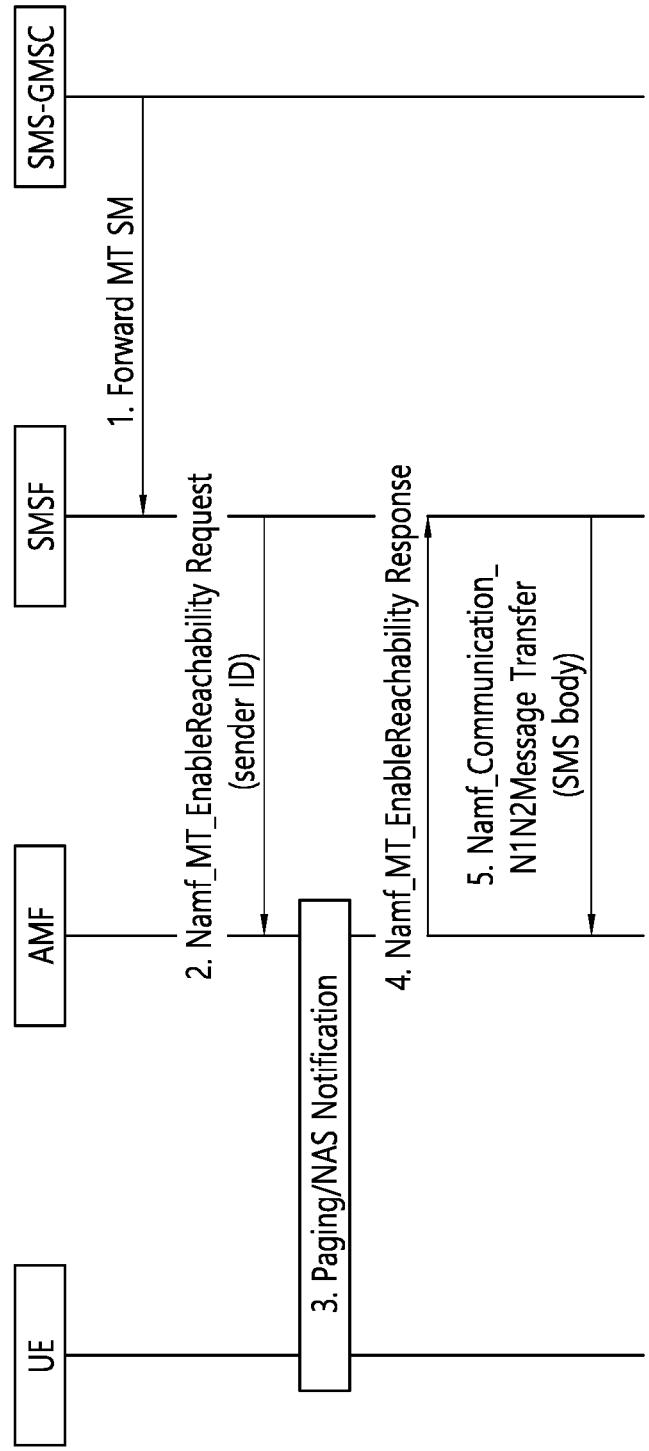
FIG. 11 is a diagram illustrating an example for confirming caller information of an SMS according to a third example of the first disclosure of the present specification.

FIG. 11 is a diagram illustrating an example for confirming caller information of an SMS according to a third example of the first disclosure of the present specification.

FIG. 11 shows an example of a method for checking caller information of SMS over NAS performed based on the operation of AMF.

After performing step 9) of FIG. 10, the UE may start service using another SIM (eg, SIM (SIM B) other than SIM A) in another PLMN (eg, PLMN B) or in the same PLMN (eg, PLMN A). For example, the operations performed in steps 1) to 9) of FIG. 10 may be operations performed in PLMN A related to SIM A included in the terminal, and after performing step 9), the terminal may perform a service using SIM B.

1) SMS-GMSC (eg, SMS-GMSC of PLMN A) may receive MT SMS (SMS over NAS) for the terminal. Here, SMS-GMSC may mean a Gateway Mobile Switching Center (MSC) For Short Message Service. Then, the SMS-GMSC may forward the MT SMS to the SMSF.

2) The SMSF may acquire ID information of the caller of the SMS (eg, caller ID such as a phone number) based on the received SMS. When the SMSF receives the MUSIM indication from the AMF in step 5) of FIG. 10, the SMSF may transmit a request message (eg, Namf_MT_EnableReachability Request message) including the caller's ID information to the AMF. Here, the Namf_MT_EnableReachability Request may be a request message to make the terminal to receive the SMS reachable.

3) AMF may transmit a paging message or a NAS notification message to the terminal. The paging message or NAS notification message may include information that downlink data for the terminal (eg, downlink data related to IMS service) exists. The paging message or NAS notification message may include the caller's ID information. The terminal may determine whether to receive a service in PLMN A (eg, whether to receive SMS over NAS from PLMN A) based on the received caller ID information (eg, caller ID information). When the terminal decides to receive a service from PLMN A, the terminal may perform a service request procedure from PLMN A.

4 and 5) The AMF may transmit a response message indicating that the terminal is reachable (eg, a Namf_MT_EnableReachability Response message) to the SMSF. When the SMSF receives a response message (eg, Namf_MT_EnableReachability Response message) from the AMF, the SMSF may transmit an SMS message (SMS body) to the AMF. For example, the SMSF may include the SMS body in the Namf_Communication_N1N2 MessageTransfer message and transmit it to the AMF. Here, the SMS body may be transmitted to the terminal to the AMF after the terminal decides to receive the service from the PLMN A and the terminal completes the service request procedure in the PLMN A. The AMF may transmit an SMS message (SMS body) to the terminal.

1-4. Fourth Example of the First Disclosure of the Present Specification

In a fourth example of the first disclosure of the present specification, a method of receiving caller information (eg, caller ID) using MUSIM AS is described. In a fourth example of the first disclosure of the present specification, a method of receiving caller information (eg, caller ID) using MUSIM AS with a focus on the operation of a terminal (eg, UE) will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12A:
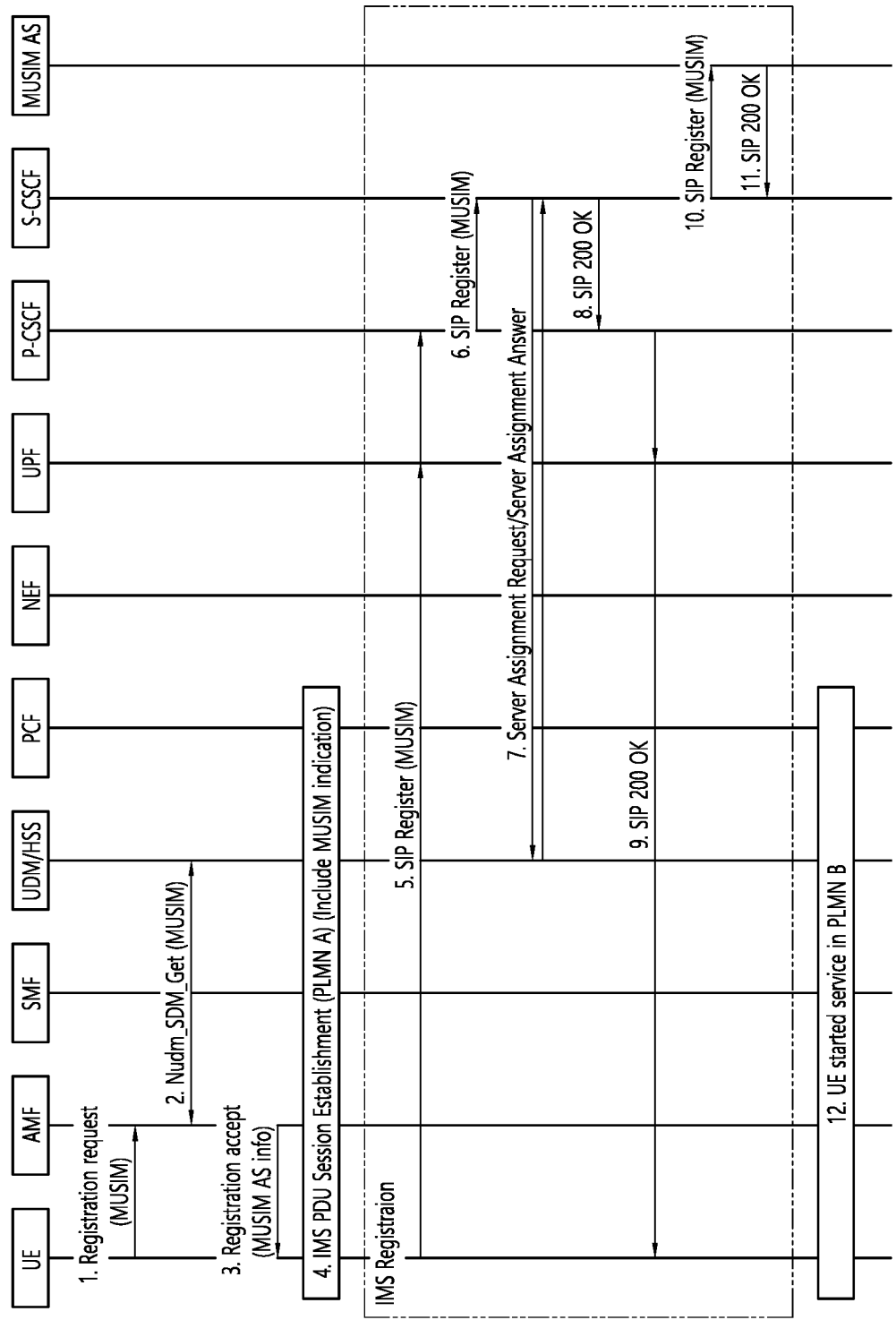
FIGS. 12a and 12b are diagrams illustrating an example of a signal flow diagram according to a fourth example of the first disclosure of the present specification.
Figure 12B:
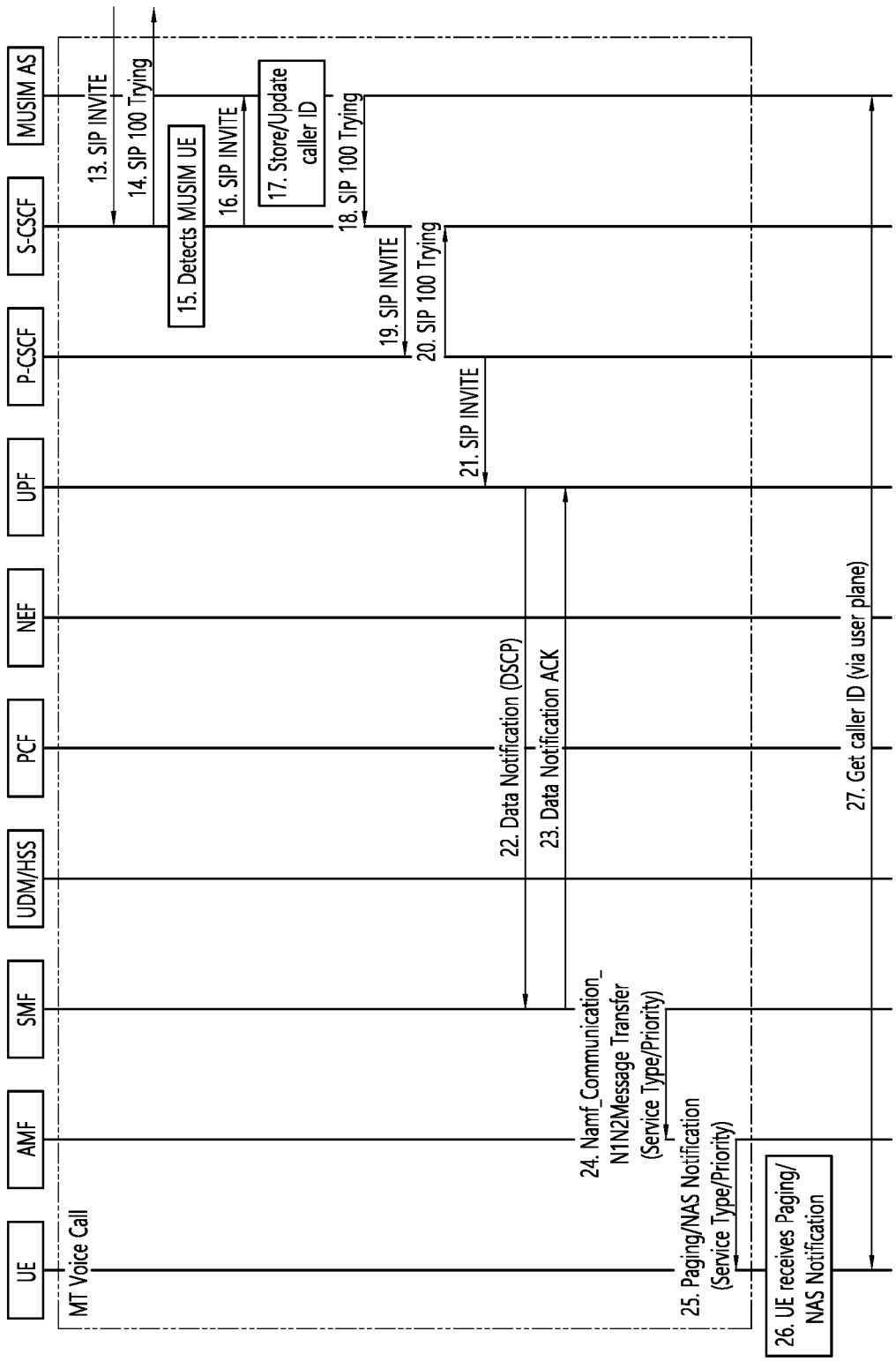

FIGS. 12a and 12b are diagrams illustrating an example of a signal flow diagram according to a fourth example of the first disclosure of the present specification.

1) The terminal may perform a registration procedure for the 5G network (eg, 5GS) of PLMN A. The terminal may transmit a registration request message for the 5G network of PLMN A to the AMF node by using SIM A. The terminal may transmit the registration request message by including the MUSIM indication (or information) in the registration request message. Here, the MUSIM indication (or information) may be information indicating that the terminal uses a plurality of SIMs or information indicating that the registration procedure is related to the plurality of SIMs. Upon receiving the MUSIM indication from the terminal, the AMF may store that the terminal performs a MUSIM-related operation. Here, the MUSIM-related operation may mean performing communication based on a plurality of SIMs. After receiving the registration request message from the terminal, the AMF may transmit a registration acceptance message to the terminal. The AMF may include information on whether the AMF can perform MUSIM-related operations (eg, whether the AMF can perform MUSIM-based communication) in the registration accept message and transmit it to the terminal.

2) When the AMF receives the MUSIM indication from the terminal in step 1), the AMF may transmit a request message (eg, Nudm_SDM_Get message) for requesting subscriber information of the terminal to the UDM or HSS. The AMF may transmit the request message (eg, Nudm_SDM_Get message) by including the MUSIM indication in the request message (eg, Nudm_SDM_Get message). The UDM or HSS may transmit address information of a MUSIM AS to be used by the terminal (eg, a MUSIM AS to perform MUSIM-related communication with the terminal) to the AMF while transmitting subscriber information of the terminal to the AMF. For example, the UDM or HSS may transmit a message (eg, Nudm_SDM_Get message) to the AMF by including subscriber information of the terminal and address information of the MUSIM AS to be used by the terminal in the message (eg, Nudm_SDM_Get message).

3) The AMF may include the MUSIM AS address information received from the UDM in the registration accept message and transmit it to the terminal.

4) After performing the registration procedure, the UE may perform a procedure for establishing (or creating) an IMS PDU session for an IMS service (eg, voice service, video service, SMS over IMS service, etc.). In the IMS PDU session establishment procedure, the UE may transmit a MUSIM indication. For example, the terminal may transmit the PDU session establishment request message to the AMF via the RAN, and the AMF may transmit the PDU session establishment request message to the SMF. The UE may transmit a PDU session establishment request message by including a MUSIM indication in the PDU session establishment request message. Upon receiving the MUSIM indication, the SMF may store that the terminal performs a MUSIM-related operation. After receiving the PDU session establishment request message from the terminal, the SMF may transmit a PDU session establishment accept message to the terminal. The SMF may include information on whether the SMF can perform a MUSIM-related operation (eg, whether the SMF can perform MUSIM-based communication) in the registration accept message and transmit it to the terminal. The operation of the terminal transmitting the MUSIM indication in the IMS PDU session establishment procedure may be performed only when the terminal receives information indicating that the MUSIM-related operation is allowed through the registration accept message in step 1).

5) After the UE establishes (or creates) the IMS PDU session in step 4), the UE may perform the IMS registration procedure. Here, the IMS registration procedure may be a procedure in which the terminal registers with network nodes (eg, P-CSCF, S-CSCF, MUSIM AS) included in the IMS network. The UE may transmit a SIP register message to the UPF, and the UPF may transmit a SIP register message to the P-CSCF. The terminal can inform that the terminal performs a MUSIM-related operation by including the MUSIM indication in the SIP register message and transmitting the SIP register message to the UPF.

6) P-CSCF may send SIP register message to S-CSCF. A MUSIM indication may also be included in the SIP message (eg, SIP register message) transmitted from the P-CSCF to the S-CSCF.

7) The S-CSCF may obtain subscriber information of the terminal from UDM/HSS (UDM or HSS). For example, the S-CSCF may transmit a server assignment request message to the UDM/HSS to request subscriber information of the terminal. Then, the UDM/HSS may transmit the subscriber information of the terminal by transmitting a server assignment answer message to the S-CSCF. The subscriber information of the terminal may include TAS (Telephony Application Server) information. The TAS information may include information related to MUSIM AS. For example, the information related to the MUSIM AS may include address information (eg, SIP URL) of the MUSIM AS.

8 to 9) The S-CSCF may transmit the SIP 200 OK message to the terminal via the P-CSCF. The S-CSCF may notify that the IMS registration is complete by transmitting a SIP 200 OK message to the terminal.

10) When the S-CSCF receives the MUSIM indication in step 6), the S-CSCF may transmit a SIP register message to the MUSIM AS based on the subscriber information received in step 5). For example, the S-CSCF may identify the MUSIM AS to which the SIP register message is to be transmitted, based on the TAS information (including information related to the MUSIM AS). The SIP register message may include a MUSIM indication.

11) The MUSIM AS may transmit a SIP 200 OK message to the S-CSCF after generating the context of the corresponding terminal. For example, the MUSIM AS may store the IP Multimedia Public Identity (IMPU) of the terminal, IP address information, and the like in the context of the terminal.

12) The UE may start a service using another SIM (eg, SIM (SIM B) other than SIM A) in another PLMN (eg, PLMN B) or in the same PLMN (eg, PLMN A). For example, the operations performed in steps 1) to 11) may be operations performed in PLMN A related to SIM A included in the terminal, and in step 12), the terminal may perform a service using SIM B.

13) In PLMN A, a Mobile Terminated (MT) call to the terminal is started, and the S-CSCF may receive a SIP INVITE message. The S-CSCF may receive the SIP INVITE message from the originating S-CSCF (ie, the S-CSCF of the caller). Although the MT voice call is shown in FIGS. 12a and 12a, this is only an example, and the MT call to the terminal may include all of various IMS services such as video call and SMS over IP.

14) The S-CSCF may transmit the SIP 100 Trying message to the originating S-CSCF.

15 to 16) The S-CSCF may know (or may determine) that the terminal performs a MUSIM-related operation based on the MUSIM indication received in step 6). Accordingly, the S-CSCF may transmit the SIP INVITE message for the terminal to the MUSIM AS.

17) MUSIM AS may obtain ID information (eg, caller ID such as a phone number) of a person (or terminal) (ie, caller) making a call based on the SIP INVITE message and store the ID information. If the MUSIM AS has previously stored the ID information (eg, caller ID such as a phone number) of the person (or terminal) (that is, the caller) making the call, the MUSIM AS may update the stored ID information with the newly acquired ID information.

18) MUSIM AS may transmit the SIP 100 Trying message to the S-CSCF after storing the caller's ID information.

19 to 20) The S-CSCF may transmit a SIP INVITE message to the P-CSCF. The P-CSCF may transmit a SIP 100 Trying message to the S-CSCF.

21) The P-CSCF may transmit a SIP INVITE message to the UPF. In this process, the P-CSCF may transmit the SIP INVITE message to the UPF using a specific Differentiated Service Code Point (DSCP) value set by an operator. The UPF may detect a specific DSCP value from an IP packet that transmits the SIP INVITE message. Then, the UPF may transmit the DSCP value to the SMF through step 22) below.

22) The UPF may transmit a Data Notification message to the SMF when the PDU session of the UE (eg, the IMS PDU session related to the MT call) is deactivated. The UPF may transmit the data notification message to the SMF by including the DSCP value set by the P-CSCF in the data notification message. The UPF may transmit information about what type of MT service the MT call started in step 13) is in the data notification message to the SMF. The SMF may recognize that an MT call to the terminal is started based on the DSCP value received from the UPF. By recognizing that the MT call to the terminal is started, the SMF may perform the operations to be described in step 24) below.

23) The SMF may transmit a data notification Ack message to the UPF to inform the UPF that the data notification message has been successfully received.

24) Upon receiving the data notification message, the SMF may transmit a request message (eg, Namf_Communication_N1N2MessageTransfer message) to the AMF. The request message (eg, Namf_Communication_N1N2MessageTransfer message) may include information that downlink data for the UE exists. The SMF may include information about which service (eg, MT voice) (service type information) or a priority value mapped to the corresponding service in the request message (eg, Namf_Communication_N1N2 MessageTransfer message) and may transmit the request message. The service type information or the priority value mapped to the corresponding service may be used by the terminal to request caller ID information such as phone number information. 25) Based on the service type information or priority information received from the SMF, the AMF may transmit a paging message or a NAS notification message to the terminal. The paging message or NAS notification message may include information that downlink data for the terminal (eg, downlink data related to IMS service) exists. The AMF may transmit the paging message or the NAS notification message by including service type information or priority information (eg, a priority value mapped to a corresponding service). For example, the AMF may transmit service type information to the terminal to directly inform that the MT service for the terminal exists. Alternatively, the AMF may transmit priority information to the terminal to indirectly inform that the MT service for the terminal exists.

26) The terminal may recognize that an MT service (eg, MT voice) for the terminal exists (or is received) based on receiving the paging message or the NAS notification message. The UE may recognize that there is an MT service (eg, MT voice) for the UE based on the service type information and/or priority information.

27) The terminal may access to MUSIM AS through a PDU session in the PLMN currently being used (eg, PLMN B related to SIM B) (ie, the PLMN with which the terminal currently perform communication), based on the address information of the MUSIM AS received in step 3). In addition, the terminal may receive caller ID information (eg, caller ID information) from the MUSIM AS. For example, the terminal may transmit a request message for requesting the caller's ID information to the MUSIM AS, and the MUSIM AS may transmit a response message including the caller's ID information to the terminal. In this process, the UE may transmit the request message by including IP address information or GPSI (eg, IMPU) used in the IMS PDU session established in PLMN A (eg, the PLMN in which the MT service is generated) in the request message. If necessary, the UE may generate a connection with the MUSIM AS after generating a PDU session in PLMN B in step 12). For example, after generating a PDU session, the UE may perform a registration procedure while providing information such as IP address information or GPSI used in PLMN A to MUSIM AS. Thereafter, when receiving a paging or NAS Notification from PLMN A, the terminal may directly request the caller's ID information (eg, phone number information) from the MUSIM AS.

1-5. Fifth Example of the First Disclosure of the Present Specification

In a fifth example of the first disclosure of the present specification, a method for receiving SMS caller information (eg, caller ID) using MUSIM AS is described. In a fifth example of the first disclosure of the present specification, a method of receiving SMS caller information (eg, caller ID) using MUSIM AS is described with a focus on the operation of a terminal (eg, UE).

1) In Case of SMS Using IMS

The operations described in the fourth example of the first disclosure of the present specification described above may be equally applied to the case of MT SMS through IMS as well as the case of MT voice call. That is, when SMS using IMS is started (or occurred), the operations described above with reference to FIGS. 12A and 12B may be performed.

For example, when MT SMS using IMS is started, in step 13) of FIGS. 12A and 12B, the S-CSCF may receive a SIP MESSAGE instead of a SIP INVITE message. Then, the S-CSCF may transmit the SIP MESSAGE to the MUSIM AS in step 16) of FIGS. 12A and 12B. Then, the MUSIM AS may obtain ID information (eg, caller ID such as a phone number) of a person (or terminal) (ie, caller) making a call based on the SIP MESSAGE. In this case, in order for the MUSIM AS to obtain the caller's ID information from the SIP MESSAGE, the MUSIM AS must support the SMS protocol stack.

2) In Case of SMS Using NAS

Hereinafter, a method of supporting SMS (SMS over NAS) using MUSIM AS will be described with a focus on the operation of a terminal (eg, UE). For example, a method of receiving caller information (eg, caller ID) of SMS (SMS over NAS) using MUSIM AS will be described focusing on the operation of a terminal (eg, UE).

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
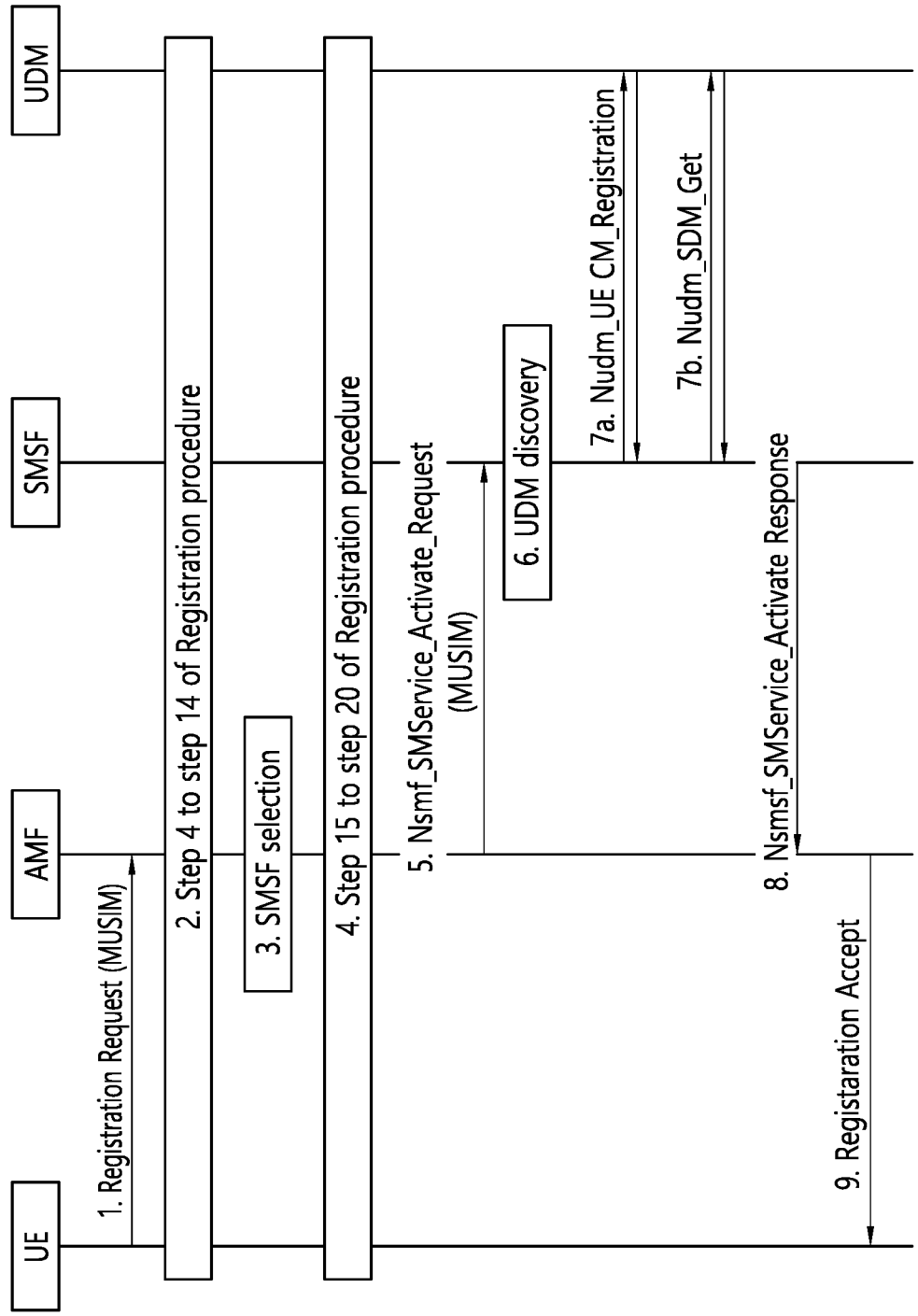
FIG. 13 is a diagram illustrating an example of a registration procedure according to a fifth example of the first disclosure of the present specification.

FIG. 13 is a diagram illustrating an example of a registration procedure according to a fifth example of the first disclosure of the present specification.

1) The terminal (eg, UE) may transmit a registration request message including a MUSIM indication to the AMF. For example, the UE may transmit a registration request message for the 5G network of PLMN A to the AMF node by using SIM A.

2) The terminal, AMF, SMSF, and UDM may perform a registration procedure (eg, steps 4 to 14 of FIGS. 5A and 5B).

3) The AMF may perform the procedure for selecting the SMSF. In a procedure for selecting an SMSF, the AMF may select an SMSF supporting a MUSIM-related operation based on the MUSIM indication received from the terminal. Here, the MUSIM-related operation may mean performing communication based on a plurality of SIMs.

4) The terminal, AMF, SMSF, and UDM may perform a silver registration procedure (eg, steps 15 to 20 of FIGS. 5A and 5B).

5) The AMF may transmit an activation request message (eg, Nsmf_SMService_Activate_Request) to the SMSF. When the terminal transmits the registration request message including the MUSIM indication in step 1), the AMF may include the MUSIM indication in the activation request message (eg, Nsmf_SMService_Activate_Request) and transmit it to the SMSF.

6, 7a, and 7b) SMSF may perform a UDM discovery procedure. When the SMSF discovers the UDM, the SMSF may perform a registration procedure for the UDM. For example, the SMSF may perform the registration procedure for the UDM with the UDM through a registration-related message (eg, Nudm_UECM_Registration message). In addition, the SMSF may obtain subscriber information of the terminal from the UDM. For example, the SMSF may obtain subscriber information of the terminal from the UDM through a message (eg, Nudm_SDM_Get message).

8) The SMSF may transmit a response message (eg, Nsmf_SMService_Activate Response message) to the activation request message (eg, Nsmf_SMService_Activate_Request) received in step 5) to the AMF. The SMSF may transmit a response message (eg, Nsmf_SMService_Activate Response message) to the AMF by including information on whether MUSIM-related operations are allowed in the response message. Through this, the SMSF may inform the AMF of whether a MUSIM-related operation is allowed.

9) AMF may transmit a registration accept message to the terminal. The AMF may inform the terminal whether a MUSIM-related operation is possible through a registration accept message. That is, the AMF may include information on whether a MUSIM-related operation is possible in the registration accept message and transmit it to the terminal.

After the terminal completes the registration procedure for the SMSF, when the MT SMS for the terminal arrives, the AMF and/or the terminal may perform communication related to the caller information of the MT SMS through the operations illustrated in the example of FIG. 14 below. For example, after the terminal completes the registration procedure for the SMSF of PLMN A (SIM A-related PLMN), in a situation in which the terminal performs a service in the SIM B-related PLMN (eg, PLMN B), when the MT SMS to the terminal is received in PLMN A, the operations shown in the example of FIG. 14 below may be performed.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14:
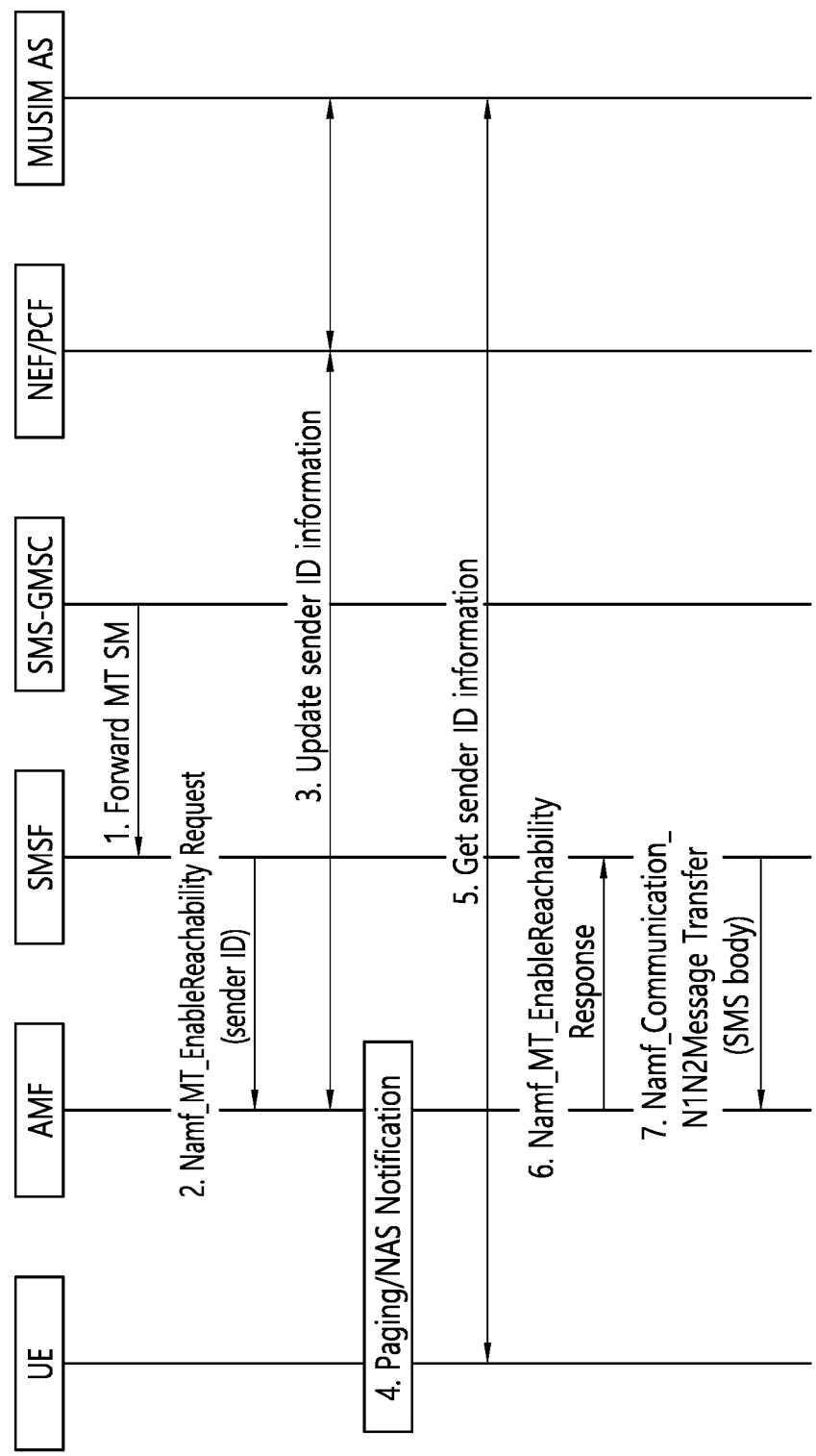
FIG. 14 is a diagram illustrating an example for confirming caller information of an SMS according to a fifth example of the first disclosure of the present specification.

FIG. 14 is a diagram illustrating an example for confirming caller information of an SMS according to a fifth example of the first disclosure of the present specification.

FIG. 14 shows an example of a method for confirming caller information of SMS over NAS performed based on the operation of the terminal.

After performing step 9) of FIG. 13, the UE may start service using another SIM (eg, SIM (SIM B) other than SIM A) in another PLMN (eg, PLMN B) or in the same PLMN (eg, PLMN A). For example, the operations performed in steps 1) to 9) of FIG. 13 may be operations performed in PLMN A related to SIM A included in the terminal, and after performing step 9), the terminal may perform service using SIM B.

1) SMS-GMSC (eg, SMS-GMSC of PLMN A) may receive MT SMS (SMS over NAS) for the terminal. Then, the SMS-GMSC may forward the MT SMS to the SMSF.

2) The SMSF may obtain ID information of the caller of the SMS (eg, caller ID such as a phone number) based on the received SMS. When the SMSF receives the MUSIM indication from the AMF in step 5) of FIG. 13, the SMSF may transmit a request message (eg, Namf_MT_EnableReachability Request message) including the caller's ID information (eg, caller ID information) to the AMF. Here, the Namf_MT_EnableReachability Request may be a request message to check whether the terminal to receive the SMS is reachable.

3) The AMF may be connected to the MUSIM AS through the NEF and/or PCF based on the caller's ID information (eg, caller ID information) received from the SMSF. For example, the AMF may be connected to the MUSIM AS based on information on the MUSIM AS in the subscriber information. For reference, the AMF may receive the subscriber information from the UDM in step 2) of FIG. 13. The AMF may transmit the caller's ID information (eg, caller ID information) to the MUSIM AS through the NEF and/or the PCF. Then, the MUSIM AS may store or update the caller's ID information (eg, caller ID information).

4) AMF may transmit a paging message or a NAS notification message to the terminal. The paging message or NAS notification message may include information that downlink data for the terminal (eg, downlink data related to IMS service) exists. The paging message or NAS notification message may include service type information or priority information.

5) After receiving the paging message or NAS notification message, the terminal recognizes that the MT SMS has occurred (or has been received) based on the service type information or priority information, and the terminal may perform communication with the MUSIM AS. The terminal may recognize that there is an MT SMS for the terminal based on the service type information and/or priority information. The terminal may connect to the MUSIM AS to obtain the caller's ID information (eg, caller ID information). For example, the terminal may transmit a request message requesting the caller's ID information (eg, caller ID information) to the MUSIM AS. Then, the MUSIM AS may transmit a response message including the caller's ID information (eg, caller ID information) to the terminal. The terminal may determine whether to receive a service from PLMN A (eg, to perform an MT call in PLMN A) (ie, whether to perform a service request procedure) based on the received caller ID information (eg, caller ID information). When the terminal decides to receive a service in PLMN A, the terminal may perform a service request procedure in PLMN A.

6 and 7) When the terminal successfully performs the service request procedure, the AMF may transmit a response message (eg, Namf_MT_EnableReachability Response message) indicating that the terminal is reachable to the SMSF. When the SMSF receives a response message (eg, Namf_MT_EnableReachability Response message) from the AMF, the SMSF may transmit an SMS message (SMS body) to the AMF. For example, the SMSF may include the SMS body in the Namf_Communication_N1N2 MessageTransfer message and transmit it to the AMF.

2. Second Disclosure of the Present Specification

In the first disclosure of the present specification, a method of performing communication (eg, A method of receiving information about the service) related to information about the service (eg, service caller information generated in a PLMN other than the PLMN in which the terminal currently performs the service) using the P-CSCF.

2-1. A First Example of the Second Disclosure of the Present Specification

In a first example of the second disclosure of the present specification, a method of receiving caller information (eg, caller ID) using P-CSCF will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15A:
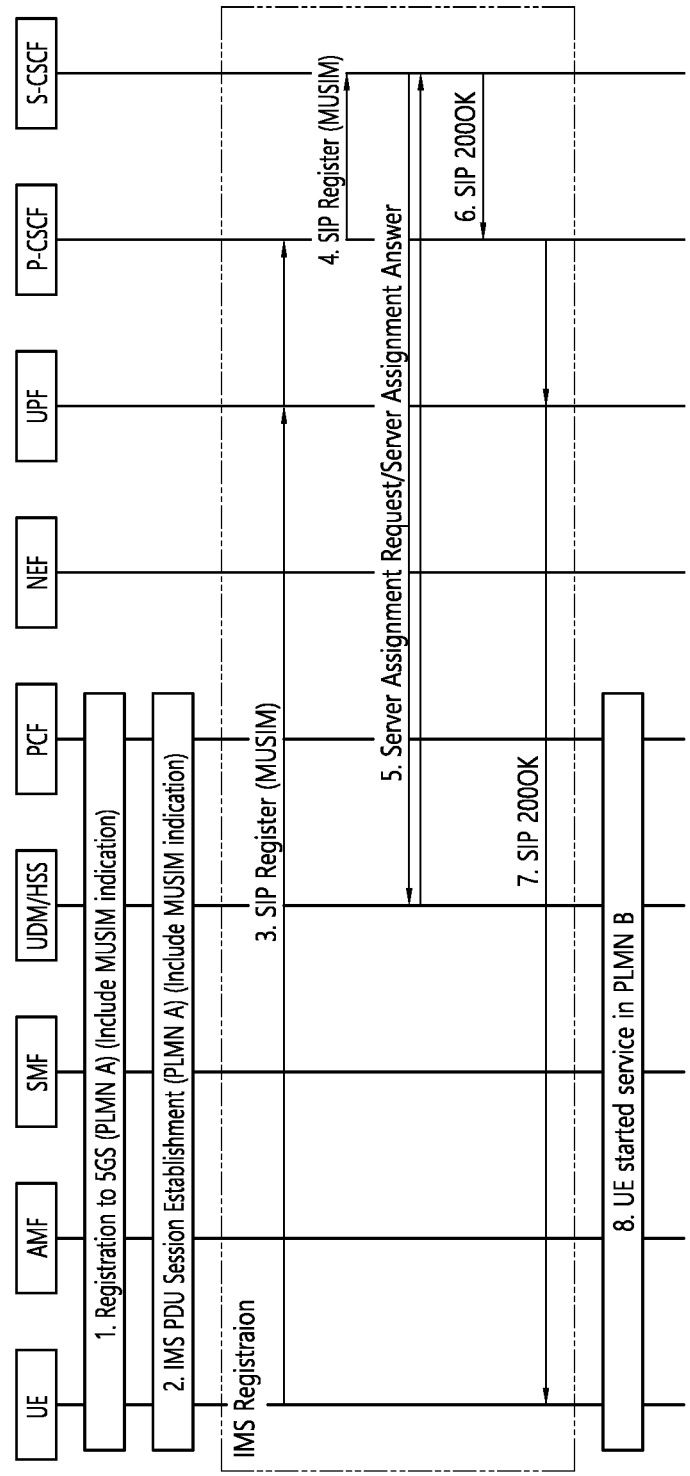
FIGS. 15a and 15b are diagrams illustrating an example of a signal flow diagram according to a first example of the second disclosure of the present specification.
Figure 15B:
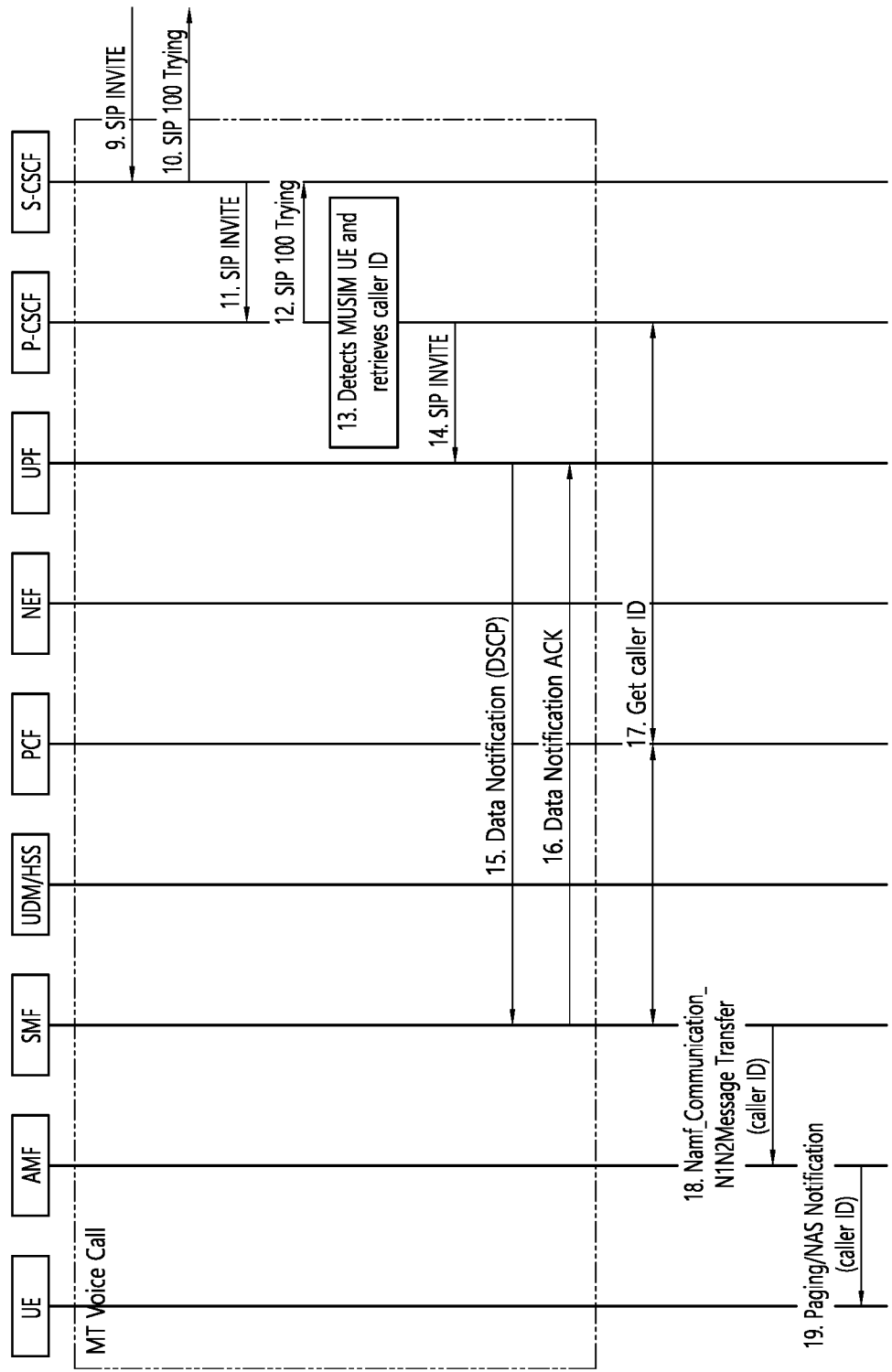

FIGS. 15a and 15b are diagrams illustrating an example of a signal flow diagram according to a first example of the second disclosure of the present specification.

1) A UE (eg, UE) may perform a registration procedure for a 5G network (eg, 5GS) of PLMN A. The UE may transmit a registration request message for the 5G network of PLMN A to the AMF node by using SIM A. The terminal may transmit the registration request message by including the MUSIM indication (or information) in the registration request message. Here, the MUSIM indication (or information) may be information indicating that the terminal uses a plurality of SIMs or information indicating that the registration procedure is related to the plurality of SIMs. Upon receiving the MUSIM indication (or information) from the terminal, the AMF may store that the terminal performs a MUSIM-related operation. Here, the MUSIM-related operation may mean performing communication based on a plurality of SIMs. After receiving the registration request message from the terminal, the AMF may transmit a registration accept message to the terminal. The AMF may include information on whether the AMF can perform MUSIM-related operations (eg, whether the AMF can perform MUSIM-based communication) in the registration accept message and transmit it to the terminal.

2) After the UE performs the registration procedure for PLMN A, the UE may perform a procedure for establishing (or generating) an IMS PDU session for an IMS service (eg, voice service, video service, Short Message Service (SMS) over IP service, etc.). In the IMS PDU session establishment procedure, the terminal may transmit a MUSIM indication. For example, the terminal may transmit the PDU session establishment request message to the AMF via the RAN, and the AMF may transmit the PDU session establishment request message to the SMF. The UE may transmit a PDU session establishment request message by including a MUSIM indication in the PDU session establishment request message. Upon receiving the MUSIM indication, the SMF may store that the terminal performs a MUSIM-related operation. After receiving the PDU session establishment request message from the terminal, the SMF may transmit a PDU session establishment accept message to the terminal. The SMF may include information on whether the SMF can perform a MUSIM-related operation (eg, whether the SMF can perform MUSIM-based communication) in the PDU session establishment accept message and transmit it to the UE. For reference, only when the terminal receives the information that the MUSIM-related operation is allowed through the registration message transmitted by the AMF in step 1), the terminal may transmit a MUSIM indication to the SMF.

3) After the terminal establishes (or generates) an IMS PDU session, it may perform an IMS registration procedure. Here, in the IMS registration procedure may be a procedure that the terminal registers the network nodes included in the IMS network (eg, P-CSCF, S-CSCF, MUSIM AS). The terminal may transmit a SIP register message to the P-CSCF to the UPF, the UPF may transmit the SIP register message to the P-CSCF. The UE may inform that the UE performs a MUSIM-related operation by including the MUSIM indication (or information) in the SIP register message and transmitting the SIP register message to the UPF. The P-CSCF may store information indicating that the terminal performs a MUSIM-related operation based on the MUSIM indication (or information) included in the SIP register message.

4) P-CSCF may transmit SIP register message to S-CSCF. A MUSIM indication may also be included in the SIP message (eg, SIP register message) transmitted from the P-CSCF to the S-CSCF.

5) S-CSCF may obtain subscriber information of the terminal from UDM/HSS (UDM or HSS). For example, the S-CSCF may transmit a server assignment request message to the UDM/HSS to request subscriber information of the terminal. Then, the UDM/HSS may transmit the subscriber information of the terminal by transmitting a server assignment answer message to the S-CSCF. The subscriber information of the terminal may include TAS (Telephony Application Server) information. The TAS information may include information related to MUSIM AS. For example, the information related to the MUSIM AS may include address information (eg, SIP URL) of the MUSIM AS.

6 to 7) The S-CSCF may transmit the SIP 200 OK message to the terminal via the P-CSCF. The S-CSCF may notify that the IMS registration is complete by transmitting a SIP 200 OK message to the terminal.

8) The UE may start a service using another SIM (eg, SIM (SIM B) other than SIM A) in another PLMN (eg, PLMN B) or in the same PLMN (eg, PLMN A). For example, the operations performed in steps 1) to 7) may be operations performed in PLMN A related to SIM A included in the terminal, and in step 8), the terminal may perform a service using SIM B.

9) A Mobile Terminated (MT) call from PLMN A to the terminal is started, and the S-CSCF may receive a SIP INVITE message. The S-CSCF may receive the SIP INVITE message from the originating S-CSCF (ie, the S-CSCF of the caller). In FIGS. 15A and 15B, an MT voice call is shown, but this is only an example, and the MT call to the terminal may include all of various IMS services such as video call and SMS over IP.

10) The S-CSCF may transmit the SIP 100 Trying message to the originating S-CSCF.

11 and 12) The S-CSCF may transmit a SIP INVITE message to the P-CSCF. The P-CSCF may transmit a SIP 100 Trying message to the S-CSCF.

13) Since the P-CSCF stored information (eg, information indicating that the terminal performs a MUSIM-related operation) indicating that the terminal requires a MUSIM-related operation in step 3), the P-CSCF may obtain the caller's ID information (eg: caller ID information) in the SIP INVITE message. In addition, the P-CSCF may store caller ID information (eg, caller ID information).

14) The P-CSCF may transmit a SIP INVITE message to the UPF. In this process, the P-CSCF may transmit the SIP INVITE message to the UPF using a specific Differentiated Service Code Point (DSCP) value set by an operator. The UPF may detect a specific DSCP value from an IP packet that transmits the SIP INVITE message. Then, the UPF may transmit the DSCP value to the SMF through step 15) below.

15) The UPF may transmit a Data Notification message to the SMF when the PDU session of the UE (eg, the IMS PDU session related to the MT call) is deactivated. The UPF may transmit the data notification message to the SMF by including the DSCP value set by the P-CSCF in the data notification message. The UPF may transmit information about what type of MT service the MT call started in step 9) is in the data notification message to the SMF. The SMF may recognize that an MT call to the terminal is started based on the DSCP value received from the UPF. By recognizing that the MT call to the terminal is started, the SMF may perform operations to be described in steps 17) and 18) below.

16) The SMF may transmit a data notification Ack message to the UPF to inform the UPF that the data notification message has been successfully received.

17) The SMF may know information indicating that the terminal requires a MUSIM-related operation (eg, information indicating that the terminal performs a MUSIM-related operation) based on the MUSIM indication (or information) received from the terminal in step 2). The SMF may obtain the caller's ID information (eg, caller ID information) from the P-CSCF through the PCF, based on the information that the terminal requires a MUSIM-related operation (eg, information that the terminal performs a MUSIM-related operation). For example, the SMF may transmit a request message requesting ID information of the caller to the P-CSCF through the PCF, and the P-CSCF may transmit a response message including the ID information of the caller to the SMF through the PCF.

Alternatively, instead of performing the operation of step 17), after the P-CSCF obtains the caller ID information (eg, caller ID information) in step 13), the P-CSCF may transmit the caller ID information to the SMF through the PCF (Example: caller ID information). That is, the operation of step 17) may be omitted.

18) The SMF may transmit a request message (eg, a Namf_Communication_N1N2MessageTransfer message) to the AMF. The request message (eg, Namf_Communication_N1N2MessageTransfer message) may include information for activating the PDU Session. The SMF may transmit the Namf_Communication_N1N2MessageTransfer message by including the caller's ID information (eg, caller ID information) in the Namf_Communication_N1N2 MessageTransfer message. For reference, the SMF may perform the operation of 24b) only when the UE transmits an IMS PDU session establishment request message including a MUSIM indication (or information) in step 2).

19) Since the AMF has received the request message (eg, Namf_Communication_N1N2MessageTransfer message) from the SMF, it may transmit a paging message or a Non Access Stratum (NAS) notification message to the UE. The paging message or NAS notification message may include information that downlink data for the terminal (eg, downlink data related to IMS service) exists. When the AMF receives the caller's ID information from the SMF, the AMF may transmit the paging message or NAS notification message to the terminal by including the caller's ID information in the paging message or NAS notification message. The AMF may perform the operation of step 19) only when the terminal transmits a registration request message including a MUSIM indication (or information) in step 1). The terminal may determine whether to receive a service from PLMN A (eg, to perform an MT call from PLMN A) based on the received caller's ID information. When the terminal decides to receive a service from PLMN A, the terminal may perform a service request procedure from PLMN A.

2-2. Second Example of the Second Disclosure of the Present Specification

In a second example of the second disclosure of the present specification, a method of receiving caller information (eg, caller ID) of SMS using P-CSCF will be described.

The operations of the first example of the second disclosure of the present specification described above may be equally applied to the case of MT SMS through IMS as well as the case of MT voice call. That is, when the SMS using IMS is started, the operations described above with reference to FIGS. 15a and 15b may be performed.

For example, when MT SMS using IMS is started, in step 9) of FIGS. 15a and 15b, the S-CSCF may receive a SIP MESSAGE instead of a SIP INVITE message. And, the S-CSCF may transmit the SIP MESSAGE to the P-CSCF. In addition, the P-CSCF may acquire ID information (eg, caller ID information such as a phone number) of a person (or terminal) (ie, caller) making a call based on the SIP MESSAGE. In this case, in order for the P-CSCF to obtain the caller's ID information from the SIP MESSAGE, the P-CSCF must support the SMS protocol stack.

The following drawings were created to explain a specific example of the present specification. Since the names of specific devices described in the drawings or the names of specific signals/messages/fields are presented by way of example, the technical features of the present specification are not limited to the specific names used in the following drawings.

According to the disclosure of the present specification, communication between a terminal supporting a plurality of SIMs and a network may be efficiently performed. For example, when the terminal uses Multi SIM, the terminal may receive caller ID information (eg, caller ID/caller ID information). Since the terminal is provided with caller ID information (eg, caller ID/caller ID information), the terminal can efficiently determine through which network the terminal will receive the service. In addition, since the terminal may inform the user of the caller ID information (eg, caller ID/caller ID information), the terminal may help the user to determine whether to perform a service in another PLMN.

For reference, the operation of the terminal (eg, UE) described in this specification may be implemented by the apparatus of FIGS. 16 to 22 to be described below. For example, the UE may be the first wireless device 100 or the second wireless device 200 of FIG. 17. For example, an operation of a terminal (eg, UE) described herein may be processed by one or more processors 102 or 202. The operations of the UE described herein may be stored in one or more memories 104 or 204 in the form of instructions/programs (e.g., executable code) executable by one or more processors 102 or 202. The one or more processors 102 or 202 may control one or more memories 104 or 204 and one or more transceivers 106 or 206, and may execute instructions/programs stored in the one or more memories 104 or 204, so that the one or more processors 102 or 202 may perform the operation of the UE (eg, UE) described in the disclosure of the present specification.

In addition, instructions for performing an operation of a terminal (eg, UE) described in the disclosure of the present specification may be stored in a non-volatile computer-readable storage medium recording instructions. The storage medium may be included in one or more memories 104 or 204. And, the instructions recorded in the storage medium may be executed by one or more processors 102 or 202 to perform the operation of the terminal (eg, UE) described in the disclosure of the present specification.

For reference, the operation of the network node (eg, AMF, SMF, UPF, UDM, HSS, PCF, P-CSCF, S-CSCF, SMSF, SMS-GMSC, NEF, MUSIM AS, etc.) described in this specification may be implemented by the apparatus of FIGS. 16 to 22, which will be described below. For example, the network node (eg, AMF, SMF, UPF, UDM, HSS, PCF, P-CSCF, S-CSCF, SMSF, SMS-GMSC, NEF, MUSIM AS, etc.) may be the first wireless device 100 or the second wireless device 200. For example, the operation of a network node (eg, AMF, SMF, UPF, UDM, HSS, PCF, P-CSCF, S-CSCF, SMSF, SMS-GMSC, NEF, MUSIM AS, etc.) described herein may be processed by the one or more processors 102 or 202. The operation of a network node (eg, AMF, SMF, UPF, UDM, HSS, PCF, P-CSCF, S-CSCF, SMSF, SMS-GMSC, NEF, MUSIM AS, etc.) may be stored in one or more memories 104 or 204 in the form of instructions/programs (eg instructions, executable code) executable by the one or more processors 102 or 202. The one or more processors 102 or 202 may control one or more memories 104 or 204 and one or more transceivers 106 or 206, and may execute instructions/programs stored in the one or more memories 104 or 204, so that the one or more processors 102 or 202 may perform the operation of the network node (eg, AMF, SMF, UPF, UDM, HSS, PCF, P-CSCF, S-CSCF, SMSF, SMS-GMSC, NEF, MUSIM AS, etc.) described in the disclosure of the present specification.

IV. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 16:
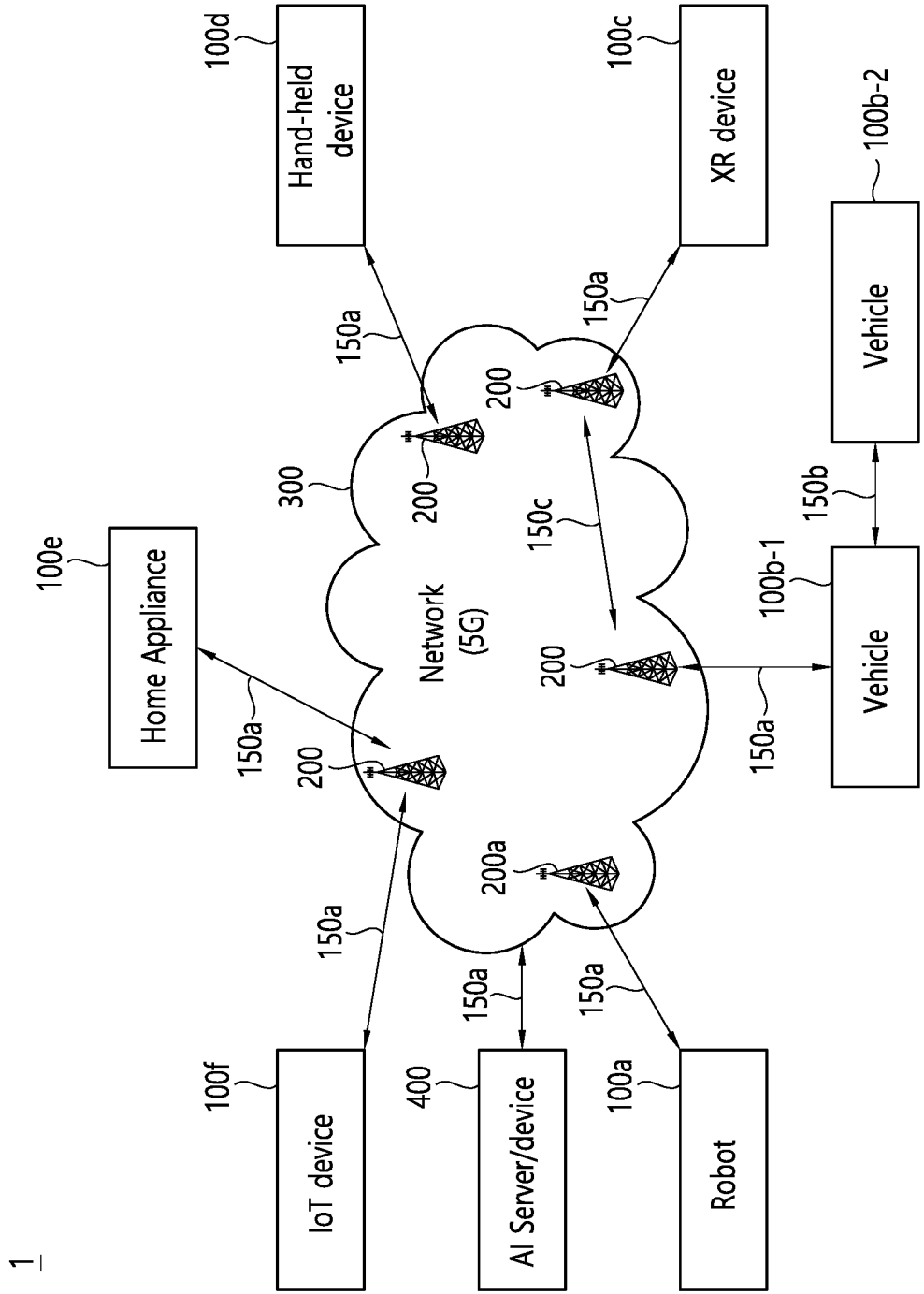
FIG. 16 illustrates a communication system 1 that can be applied to the present specification.

FIG. 16 illustrates a communication system 1 that can be applied to the present specification.

Referring to FIG. 16, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 17:
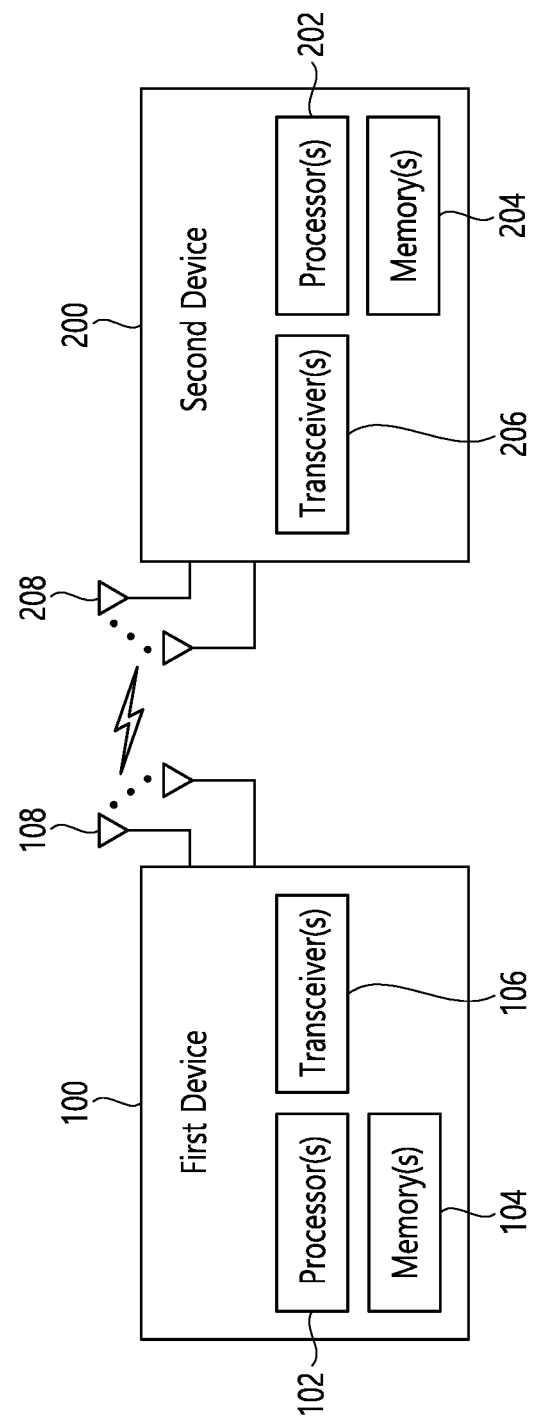
FIG. 17 illustrates an example of a wireless device that can be applied to the present specification.

FIG. 17 illustrates an example of a wireless device that can be applied to the present specification.

Referring to FIG. 17, the first wireless device 100 and the second wireless device 200 may transmit and receive wireless signals through various wireless access technologies (eg, LTE, NR). Here, {first wireless device 100, second wireless device 200} may refer to {wireless device 100x, base station 200} and/or {wireless device 100x, wireless device 100x} of FIG. 16. Alternatively, it may correspond to the first wireless device 100 and UE, AMF, SMF, or UPF, etc described in the disclosure of the present specification. In addition, the second wireless device 200 may correspond to a UE, AMF, SMF, or UPF, etc. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/ chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 18:
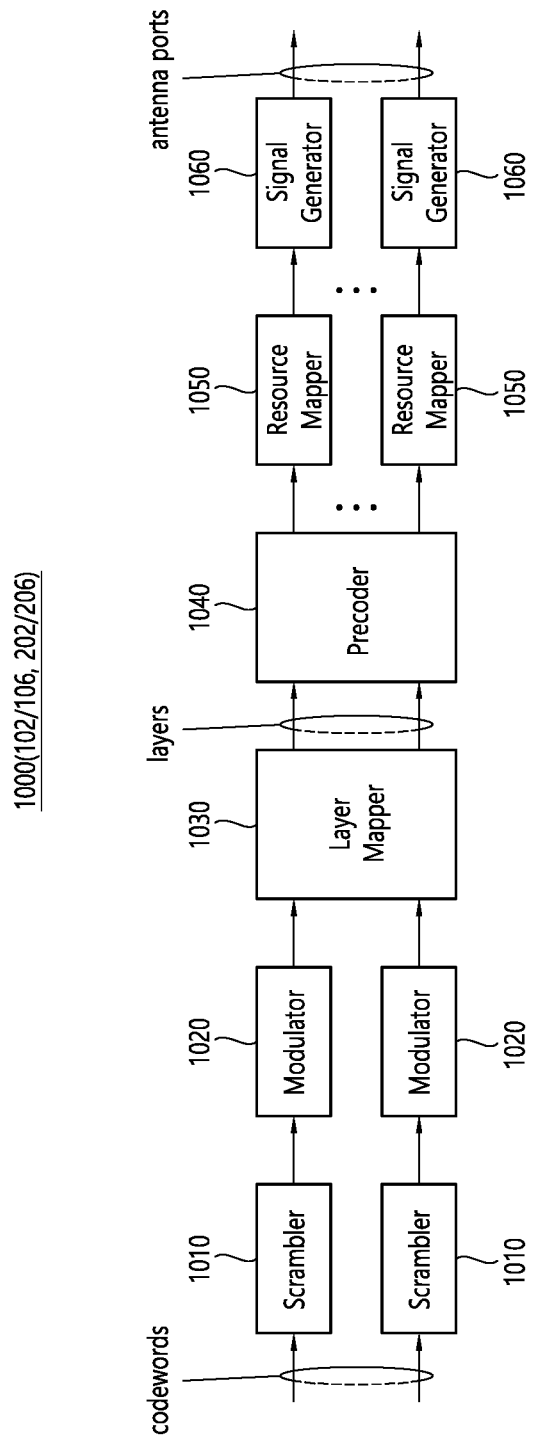
FIG. 18 illustrates an example of a signal processing circuit for a transmission signal.

FIG. 18 illustrates an example of a signal processing circuit for a transmission signal.

Referring to FIG. 18, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 18 may be performed in the processor (102, 202), the memory (104, 204) and/or transceiver (106, 206) of FIG. 17. The hardware element of FIG. 18 may be implemented in the processors 102 and 202 and/or the transceivers 106 and 206 of FIG. 17. For example, blocks 1010-1060 may be implemented in the processors 102, 202 of FIG. 17. Also, blocks 1010-1050 may be implemented in the processors 102 and 202 of FIG. 17, and block 1060 may be implemented in the transceivers 106 and 206 of FIG. 17.

The codeword may be converted into a wireless signal through the signal processing circuit 1000 of FIG. 18. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 18. For example, a wireless device (e.g., 100 and 200 of FIG. 17) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 19:
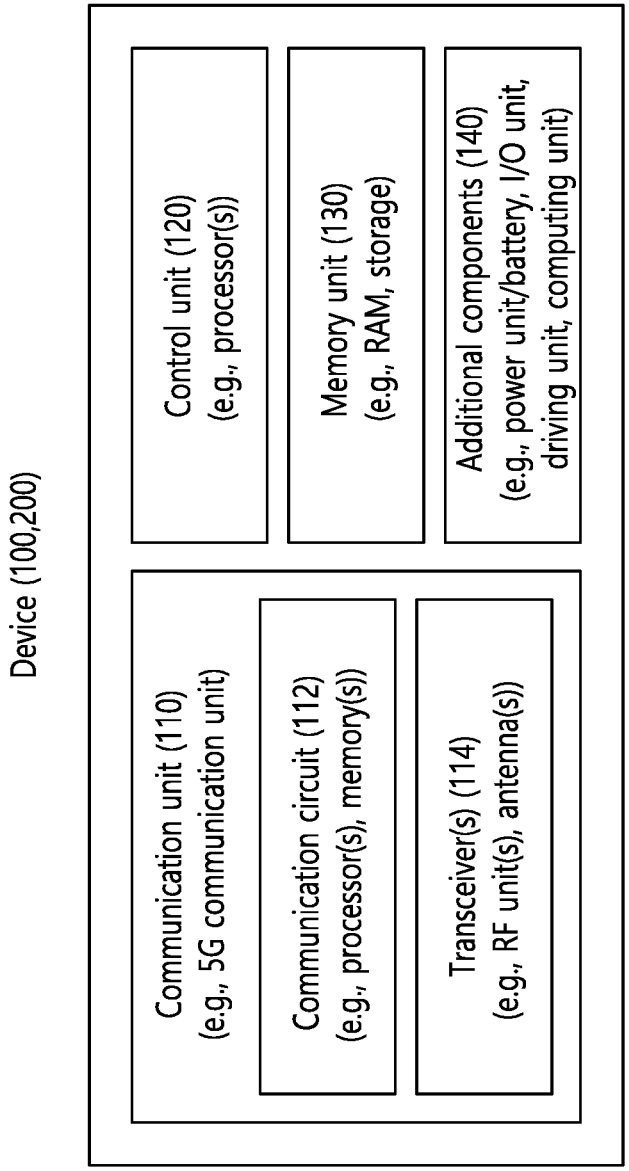
FIG. 19 illustrates another example of a wireless device that can be applied to the present specification.

FIG. 19 illustrates another example of a wireless device that can be applied to the present specification.

The wireless device may be implemented in various forms according to use-examples/services (refer to FIG. 16).

Referring to FIG. 19, the wireless devices 100 and 200 correspond to the wireless devices 100 and 200 of FIG. 17, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 17. For example, the transceiver (s) 114 may include one or more transceivers 106, 206 and/or one or more antennas 108, 208 of FIG. 17. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 17. For example, the memory unit 130 may include one or more memories 104 and 204 of FIG. 17.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 16, 100a), a vehicle (FIG. 16, 100b-1, 100b-2), an XR device (FIG. 16, 100c), a portable device (FIG. 16, 100d), a home appliance. (FIG. 16, 100e), IoT devices (FIG. 16, 1000, terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 19, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 20:
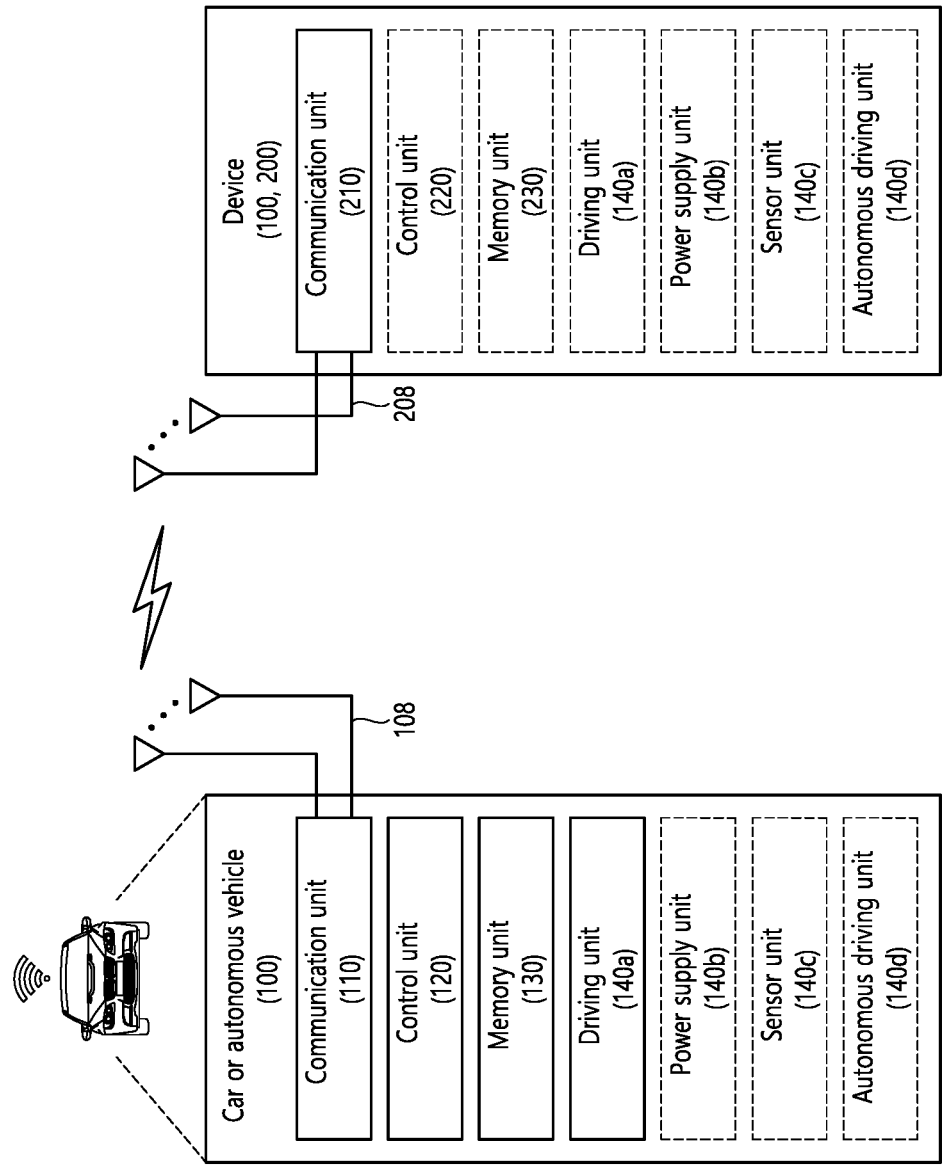
FIG. 20 illustrates an example of a vehicle or an autonomous vehicle that can be applied to the present specification.

FIG. 20 illustrates an example of a vehicle or an autonomous vehicle that can be applied to the present specification.

FIG. 20 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 20, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 19, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 21:
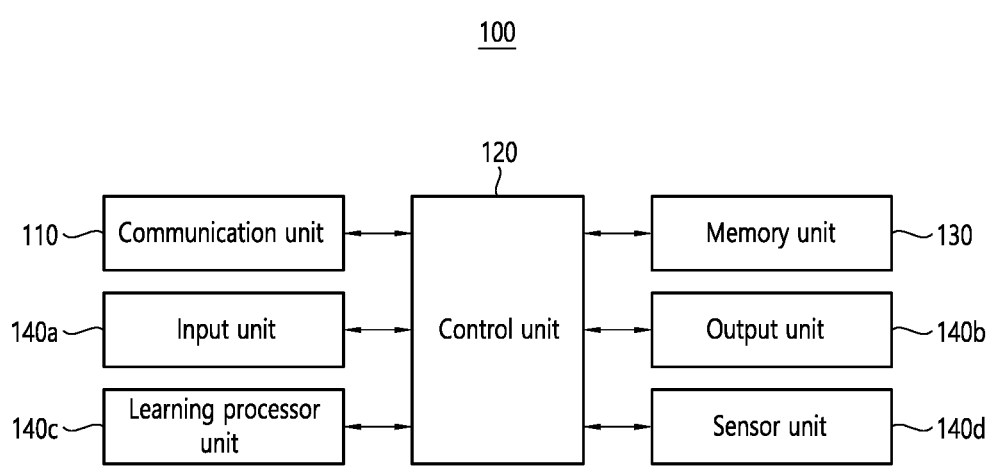
FIG. 21 illustrates an example of an AI device that can be applied to the disclosure of the present specification.

FIG. 21 illustrates an example of an AI device that can be applied to the disclosure of the present specification.

FIG. 21 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 21, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 19.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 16) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 16, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 22:
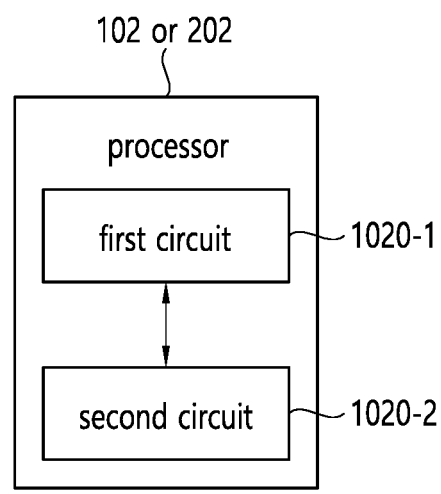
FIG. 22 is a detailed configuration block diagram of the processor shown in FIG. 17.

FIG. 22 is a detailed configuration block diagram of the processor shown in FIG. 17.

As can be seen with reference to FIG. 22, a processor 1020 in which the disclosure of this specification is implemented includes a plurality of circuitry to implement the proposed functions, procedures and/or methods described herein. For example, the processor 1020 may include a first circuit 1020-1 and a second circuit 1020-2. Also, although not shown, the processor 1020 may include more circuits. Each circuit may include a plurality of transistors.

The terminal (eg, UE) described in the disclosure of this specification may include a chipset (eg, a processor 102 or 202) including the first circuit 1020-1 and the second circuit 1020-2 of FIG. 22. Such a chipset (eg, the processor 102 or 202) may perform operations of a terminal (eg, UE) described in the disclosure of the present specification. For example, the first circuit 1020-1 may perform an operation related to MUSIM indication (or information) such as generation, storage, and/or transmission of MUSIM indication (or information) among the operations of the terminal described in the disclosure of the present specification. For example, the second circuit 1020-2 may perform operations related to the caller's ID information such as reception and storage of the caller's ID information (eg, caller ID information, caller ID information) among the operations of the terminal described in the disclosure of the present specification. Also, the second circuit 1020-2 may determine whether to perform a service request procedure for another PLMN based on the caller's ID information.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for an Access and Mobility Management Function (AMF) node of a first network to perform communication based on a plurality of Subscriber Identification Modules (SIMs), the method comprising:
   receiving a registration request message from the terminal through the base station of the first network,
   wherein the registration request message includes information related to a plurality of SIMs;
   receiving a first message including information requesting PDU Session activation of the terminal from a Session Management Function (SMF) node of the first network;
   receiving a second message including identification (ID) information of a caller related to the downlink data; and
   based on that the first message and the information related to the plurality of SIMs are received, transmitting a paging message or a Non Access Stratum (NAS) notification message including the caller's ID information to the terminal through the base station of the first network,
   wherein the ID information of the caller is transmitted by the Application Server (AS) to the UDM node or HSS node of the first network node,
   wherein the ID information of the caller is information obtained by the AS in a Session Initiation Protocol (SIP) message related to the downlink data.

2. The method of claim 1,
   wherein the second message is received from a Unified Data Management (UDM) node or a Home Subscriber Server (HSS) node of the first network,
   wherein the first message is received after the second message is received.

3. The method of claim 1, further comprising:
   based on that the first message and the information related to the plurality of SIMs are received, transmitting a third message requesting ID information of the caller to the AS,
   wherein the third message is transmitted to the AS via a PCF node and/or an NEF node of the first network.

4. The method of claim 3,
   wherein the second message is received in response to the third message.

5. The method of claim 1,
   wherein the terminal includes a first SIM associated with the first network and a second SIM associated with a second network,
   wherein the terminal is in a state of performing communication in a second network using the second SIM after transmitting the registration request message.

6. The method of claim 1, further comprising:
   in response to the registration request message, transmitting a registration accept message to the terminal through the base station of the first network,
   wherein the registration accept message includes information on whether an operation related to a plurality of SIMs is possible.

7. The method of claim 1,
   wherein the first message includes information related to the plurality of SIMs.

8. The method of claim 1,
   wherein the downlink data is data related to an Internet Protocol (IP) Multimedia Subsystem (IMS) service for the terminal.

9. A method for performing communication based on a plurality of Subscriber Identification Module (SIM), the method performed by a terminal and comprising:
   transmitting a registration request message including information related to a plurality of SIMs to an Access and Mobility Management Function (AMF) node of a first network through a base station of a first network;
   transmitting a Session Initiation Protocol (SIP) registration message including information related to the plurality of SIMs to a Proxy Call Session Control Function (P-CSCF) node of the first network through a base station of the first network; and
   while the terminal performs communication in the second network, receiving a paging message or a Non Access Stratum (NAS) notification message including information related to the service type of the downlink data for the terminal and ID information of a caller from the AMF node of the first network through the base station of the first network,
   wherein the information related to a plurality of SIMs included in the SIP registration message is used for an application server (AS) to obtain ID information of a caller in the SIP message related to the downlink data,
   wherein the ID information of the caller is transmitted by the Application Server (AS) to the UDM node or HSS node of the first network node,
   wherein the ID information of the caller is information obtained by the AS in a Session Initiation Protocol (SIP) message related to the downlink data.

10. The method of claim 9,
    wherein the terminal includes a first SIM related to the first network and a second SIM related to the second network.

11. The method of claim 9, further comprising:
    transmitting a Protocol Data Unit (PDU) session establishment request message including information related to the plurality of SIMs to the AMF node of the first network through the base station of the first network,
    wherein the PDU session establishment request message is a message for requesting establishment of a PDU session for an Internet Protocol Multimedia Subsystem (IMS) service.

12. The method of claim 9, further comprising:
in response to the registration request message, step of receiving a registration accept message from the AMF node of the first network through the base station of the first network,
wherein the registration accept message includes information on whether an operation related to a plurality of SIMs is possible.

13. A wireless communication device for performing communication based on a plurality of Subscriber Identification Module (SIM), comprising:
at least one processor; and
at least one memory for storing instructions and operably electrically connectable with the at least one processor;
wherein the operations performed based on the execution of the instructions by the at least one processor include:
transmitting a registration request message including information related to a plurality of SIMs to an Access and Mobility Management Function (AMF) node of a first network through a base station of a first network;
transmitting a Session Initiation Protocol (SIP) registration message including information related to the plurality of SIMs to a Proxy Call Session Control Function (P-CSCF) node of the first network through a base station of the first network; and
while the terminal performs communication in the second network, receiving a paging message or a Non Access Stratum (NAS) notification message including information related to the service type of the downlink data for the terminal and ID information of a caller from the AMF node of the first network through the base station of the first network,
wherein the information related to a plurality of SIMs included in the SIP registration message is used for an application server (AS) to obtain ID information of a caller in the SIP message related to the downlink data,
wherein the ID information of the caller is transmitted by the Application Server (AS) to the UDM node or HSS node of the first network node,
wherein the ID information of the caller is information obtained by the AS in a Session Initiation Protocol (SIP) message related to the downlink data.

14. The wireless communication device of claim 13, wherein the wireless communication device is an autonomous driving device that communicates with at least one of a mobile terminal, a network, and an autonomous vehicle other than the wireless communication device.

* * * * *